(12) United States Patent
Bruck et al.

(10) Patent No.: US 12,025,831 B2
(45) Date of Patent: Jul. 2, 2024

(54) END-FACE COUPLING STRUCTURES WITHIN ELECTRICAL BACKEND

(71) Applicant: Cisco Technology, Inc., San Jose, CA (US)

(72) Inventors: Roman Bruck, Vienna (AT); Thierry J. Pinguet, Arlington, WA (US); Attila Mekis, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/297,373

(22) Filed: Apr. 7, 2023

(65) Prior Publication Data
US 2023/0244031 A1 Aug. 3, 2023

Related U.S. Application Data

(62) Division of application No. 17/249,060, filed on Feb. 18, 2021, now Pat. No. 11,675,128.

(51) Int. Cl.
| | |
|---|---|
| *G02B 6/132* | (2006.01) |
| *G02B 6/122* | (2006.01) |
| *G02B 6/13* | (2006.01) |
| *G02B 6/136* | (2006.01) |

(52) U.S. Cl.
CPC ............ *G02B 6/122* (2013.01); *G02B 6/13* (2013.01); *G02B 6/132* (2013.01); *G02B 6/136* (2013.01)

(58) Field of Classification Search
CPC ........... G02B 6/13; G02B 6/132; G02B 6/136
See application file for complete search history.

(56) References Cited

U.S. PATENT DOCUMENTS

| | | | | |
|---|---|---|---|---|
| 6,403,393 B1* | 6/2002 | Adkisson | ............... | G02B 6/122 438/31 |
| 8,761,552 B1* | 6/2014 | Hochberg | ......... | H01L 21/76838 438/31 |
| 2001/0041027 A1* | 11/2001 | Hornbeck | ............... | G02B 6/125 385/47 |
| 2011/0129182 A1* | 6/2011 | Yamamoto | ............... | G02B 6/43 156/150 |
| 2015/0097289 A1* | 4/2015 | Zhang | .................... | H01L 23/522 438/653 |
| 2016/0327737 A1* | 11/2016 | Zhang | ..................... | H01L 31/12 |
| 2020/0395302 A1* | 12/2020 | Yu | ...................... | G02B 6/12002 |

* cited by examiner

*Primary Examiner* — Michael Stahl
(74) *Attorney, Agent, or Firm* — Patterson + Sheridan, LLP

(57) ABSTRACT

End-face coupling structures within an electrical backend are provided via photonic integrated circuit (PIC), comprising: a first plurality of spacer layers; a second plurality of etch-stop layers, wherein each etch-stop layer of the second plurality of etch-stop layers is located between two spacer layers of the first plurality of spacer layers; and an optical coupler comprising a plurality of waveguides arranged as a waveguide array configured to receive an optical signal in a direction of travel, wherein each waveguide of the plurality of waveguides is located at a layer interface defined between an etch-stop layer and a spacer layer. Portions of the PIC can be formed by depositing layers of spacer and etch-stop materials in which cavities are formed to define the waveguides when the waveguide material is deposited or interconnects when a metal is deposited therein.

17 Claims, 17 Drawing Sheets

END-FACE COUPLING STRUCTURES WITHIN ELECTRICAL BACKEND

CROSS-REFERENCE TO RELATED APPLICATIONS

This application is a divisional of co-pending U.S. patent application Ser. No. 17/249,060 filed Feb. 18, 2021. The aforementioned related patent application is herein incorporated by reference in its entirety.

TECHNICAL FIELD

Embodiments presented in this disclosure generally relate to photonic interfaces for end-face coupling (also referred to as direct coupling, butt-coupling, or edge coupling), where an external optical source (for example a fiber optic cable or a laser diode) directly feeds an optical signal into a waveguide defined in a photonic integrated chip (PIC). More particularly, the technology relates to methods of fabrication or the end-product of such methods of fabrication that include several dielectric layers to allow for the deposition of beam-size converting waveguide arrays as well as control metal interconnect patterning on the PIC in a single process flow.

BACKGROUND

The electrical backend is a layer stack of dielectrics that houses multiple metal lines and connections used to provide power and electrical signal routing within the PIC, which may include interfacing with active optoelectronic devices (i.e. devices with both optical and electrical interfaces) such as optical signal detectors and modulators. The presence of electrical backend elements can affect where optical elements are located (e.g., by blocking or interfering with light paths) and affect the formation of optical elements during fabrication. End-face coupling (EFC) allows the light path into or out of a PIC to use a surface in the same direction as the receiving waveguide on the chip. The region where light travels for end-face coupling generally needs to be free of electrical elements as the electrical elements are highly absorptive and strongly interfere with light propagation. As optical signals received via EFC do not need to change a direction of propagation of the optical signals and no wave interference is required, EFC offers several advantages in terms of bandwidth, but still requires mode conversion to handle the different beam sizes used in optical fibers and in PICs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
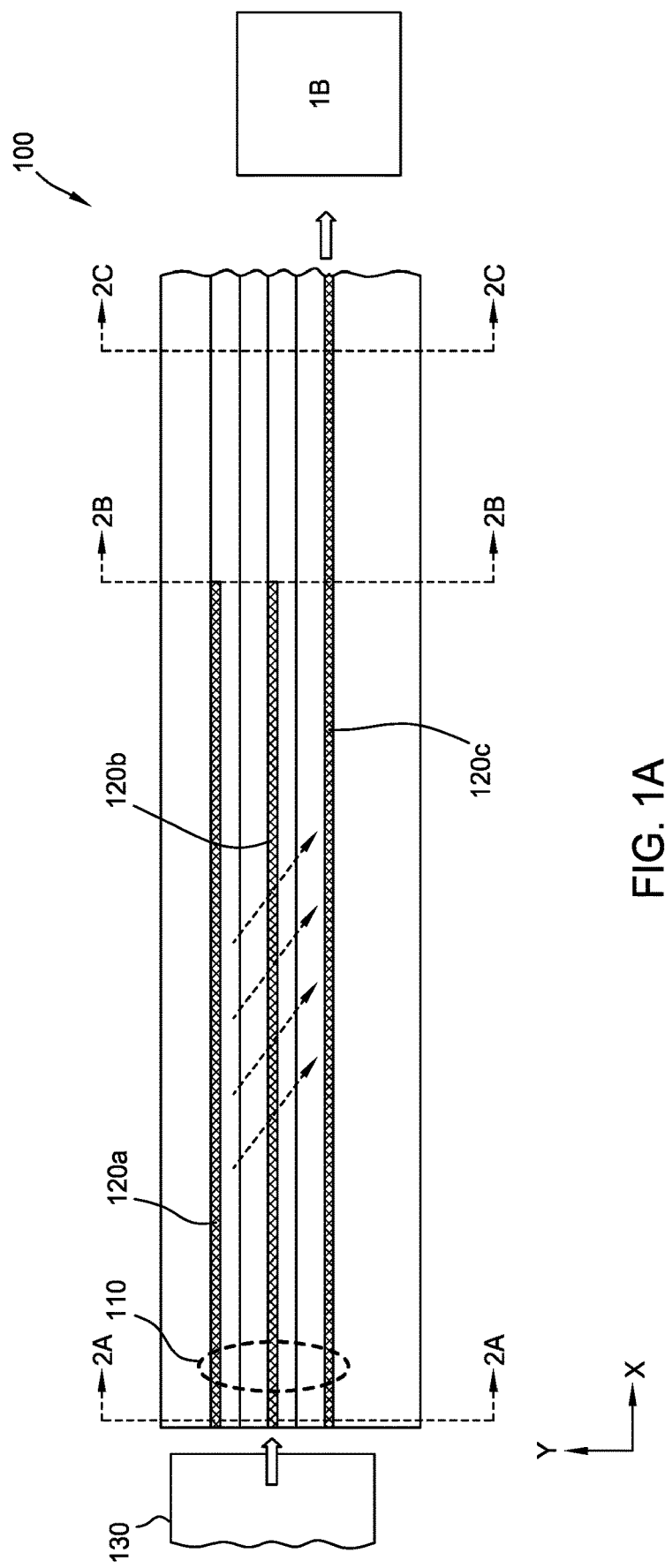
FIGS. 1A and 1B illustrate a PIC that includes a waveguide array located in the electrical backed on the PIC that is configured for end-face coupling, according to embodiments of the present disclosure.

One embodiment presented in this disclosure is a photonic integrated circuit (PIC), comprising: a first plurality of spacer layers; a second plurality of etch-stop layers, wherein each etch-stop layer of the second plurality of etch-stop layers is located between two spacer layers of the first plurality of spacer layers; and an optical coupler comprising a plurality of waveguides arranged as a waveguide array configured to receive an optical signal in a direction of travel, wherein each waveguide of the plurality of waveguides is located at a layer interface defined between an etch-stop layer and a spacer layer.

One embodiment presented in this disclosure is a method, comprising: forming a first cavity in a first layer of a spacer material; depositing a waveguide material over the first layer to fill the first cavity; planarizing the waveguide material to define a first plane even with a first surface of the first layer; forming a second cavity in the spacer material; electroplating a metal to fill the second cavity to define an electrical interconnect through the spacer material; and removing a portion of the metal to define a second surface of the electrical interconnect.

One embodiment presented in this disclosure is a method, comprising: forming an electrical conductor in a first dielectric layer, wherein a first surface of the electrical conductor and a second surface of the first dielectric layer define a first surface are defined in a first plane; depositing a first etch-stop layer over the first plane in a second plane parallel to the first plane; depositing a second dielectric layer on the first etch-stop layer in a third plane parallel to the second plane; depositing a second etch-stop layer on the second dielectric layer in a fourth plane parallel to the third plane; depositing a third dielectric layer on the second etch-stop layer in a fifth plane parallel to the fourth plane; forming a first cavity in the third dielectric layer; depositing waveguide material on the third dielectric layer and into the first cavity; removing the waveguide material above the fifth plane relative to the third dielectric layer; forming a second cavity through the fifth plane, fourth plane, third plane, second plane, and first plane, wherein the second cavity exposes the first surface of the electrical conductor from the first etch-stop layer; and electroplating metal in the second cavity to form an interconnect between the electrical conductor and the fifth plane.

One embodiment presented in this disclosure is a system, comprising: an external optical device configured to carry an optical signal of a first beam size; and photonic integrated circuit (PIC) including: a first face, connected to the external optical device via a waveguide array that includes: a plurality of layers defined in planes perpendicular to the first face, wherein the layers of the plurality of layers comprise etch-stop layers and spacer layers; a plurality of waveguides that are located at interfaces defined between pairs of adjacent layers of the plurality of layers; and a second face, perpendicular to the first face, including an electrical contact connected to an electrical interconnect that runs through the plurality of layers in a plane parallel to the first face that includes of the plurality of waveguides.

One embodiment presented in this disclosure is a method, comprising: forming an electrical conductor in a first dielectric layer, wherein a first surface of the electrical conductor and a second surface of the first dielectric layer define a first surface are defined in a first plane; depositing a first etch-stop layer over the first plane in a second plane parallel to the first plane; depositing a second dielectric layer on the first etch-stop layer in a third plane parallel to the second plane; forming a first cavity in the second dielectric layer; depositing waveguide material on the second dielectric layer and into the first cavity; removing the waveguide material above the third plane relative to the second dielectric layer; depositing a second etch-stop layer on the second dielectric layer in a fourth plane parallel to the third plane; depositing a third dielectric layer on the second etch-stop layer in a fifth plane parallel to the fourth plane; forming a second cavity through the fifth plane, fourth plane, third plane, second plane, and first plane, wherein the second cavity exposes the first surface of the electrical conductor from the first etch-stop layer; and electroplating metal in the second cavity to form an interconnect between the electrical conductor and the fifth plane.

Example Embodiments

The present disclosure provides for the integration of End-Face Coupling (EFC) compatible waveguides with an electrical backend in Photonic Integrated Circuits (PIC). The electrical backend is a layered stack of dielectric layers, into which electrical conductors/interconnects are introduced. These electrical conductors are provided for routing electrical energy and signals though the PIC to external devices and internally to various active elements for manipulating or measuring optical signals on the PIC. The electrical backend is produced on top of the photonic layers of the PIC and may be constructed with different materials using different processes than carrier waveguides, active optical devices, and the surrounding substrates. The present disclosure provides methods for the integration of waveguides into the processes used for producing an electrical backend as well as the physical devices produced thereby.

Because the mode sizes of the optical fibers used to transmit optical signals between PICs can be orders of magnitude larger than the mode sizes of the internal waveguides for the PICs, various coupling structures are used as spot size converters to provide efficient coupling. In a PIC, a spot size converter of a mode-converting waveguide array can be used to alter the size of a beam (e.g., with an initial beam of radius X increasing to Y radius or decreasing to Z radius) entering or exiting the PIC. When accepting an input beam from an optical fiber, some waveguide arrays gradually reduce the input beam in size to shunt the optical signal received from the optical fiber to a main waveguide in the PIC. Similarly, when providing an output beam to an optical fiber, some waveguide arrays gradually increase the output beam in size to direct the optical signal received from the main waveguide of the PICs to the optical fiber. The various optical components of the PIC co-exist with electrical components in the backend of the photonic chip, which are disposed above the main photonic layer (relative to a shared substrate).

Although grating couplers (which redirect optical signals from a first plane to a second plane) have proven to be useful as spot size converters that offer low-loss optical coupling, the restricted bandwidths that grating couplers operate in can limit the practicality of using grating couplers in high-bandwidth PICs. For example, grating couplers typically have operational bandwidth windows of 20-30 nm (nanometers), whereas the CWDM4 (4-channel Coarse Wavelength Division Multiplexing) standard allows for signals to be divided across a bandwidth window of 73 nm. The waveguide arrays described herein provide for broadband coupling of optical signals (e.g., in a wavelength window of at least 73 nm, but typically more than 100 nm) across mode sizes with low coupling losses (e.g., −1 dB (decibels)±10%) without interfering with the construction of electrical elements in a shared backend.

Figure 1B:
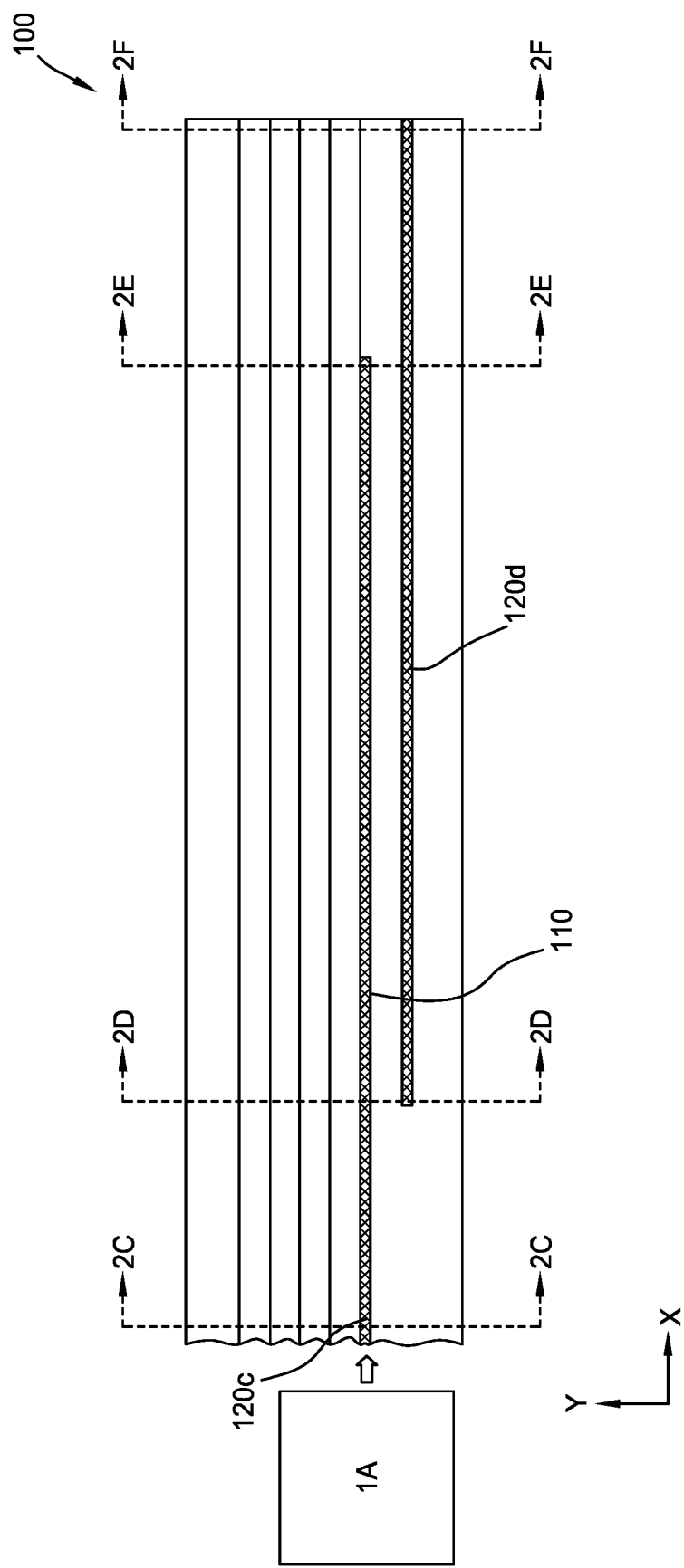

FIGS. 1A-1B and 2A-2F, illustrate various cross-sectional views of a PIC 100 including a waveguide array 110 made of several waveguides 120a-f (generally or collectively, waveguides 120) in the electrical backend of the PIC 100. FIGS. 1A-1B illustrate segments of the PIC 100 in a first plane (e.g., the XY plane) and several locations for where the segments in perpendicular planes (e.g., the XZ plane) illustrated in FIGS. 2A-2F are positioned. FIG. 3 illustrates an isometric view that highlights the relative layouts of the waveguides 120 discussed in relation to FIGS. 1A-1B and 2A-2F.

FIG. 1A illustrates an EFC section of a PIC 100 and FIG. 1B illustrates a second section of the PIC 100, according to embodiments of the present disclosure. The views of the PIC 100 illustrated in FIGS. 1A and 1B are cross-sectional views that highlight several waveguides 120a-c that comprise a waveguide array 110 for optically coupling a carrier waveguide in the PIC 100 with an external optical device, represented as an optical fiber 130. Other waveguides 120 that are part of the waveguide array may not be visible in FIGS. 1A and 1B, but are discussed in greater detail in regard to FIGS. 2A-2F.

Although the examples given herein primarily discuss the waveguide array 110 receiving optical signals input to the PIC 100 from the optical fiber 130 (e.g., receiving an optical signal of a first beam size from the optical fiber 130 and shifting the optical signal to a smaller second beam size in the PIC 100), the described waveguide array 110 is also operable to transmit optical signals output from the PIC 100 to the optical fiber 130 (e.g., receiving an optical signal of a first beam size in the PIC 100 and shifting the optical signal to a larger second beam size onto the optical fiber 130). Accordingly, one of ordinary skill in the art will be able to apply any example provided herein in one direction of travel for the optical signals in the reverse direction of travel without undue experimentation.

The waveguide array 110 optically couples with the optical fiber 130 on a first side of the PIC 100 in a EFC arrangement, and with a carrier or fourth waveguide 120d located internally and away from the face that the optical fiber 130 is connected to within the PIC 100 (e.g., as shown in FIG. 1B, but not in FIG. 1A). In various embodiments, the waveguides 120 of the waveguide array 110 are recessed from the surface of the PIC 100 mated to the optical fiber 130, and the mating surface may include various protective or anti-reflective coatings. The waveguides 120 are arranged in a direction of travel for optical signals so that signals entering the PIC 100 from the optical fiber 130 maintain a direction of travel into the waveguide array 110. Stated differently, the EFC arrangement of the optical fiber 130 and the waveguide array 110 allow for a designer to avoid using diffractive or reflective elements (e.g., gratings, lenses, mirrors) that receive light in a first plane and redirect the direction of travel to a second, non-parallel plane. Instead, the waveguide array 110 gradually shifts the optical signal, over the direction of travel, from the first plane to a second parallel plane, while shaping the beam size from the beam size of the optical fiber 130 to the beam size of the carrier waveguide 120. Accordingly, the waveguide array 110 begins at a first location and ends at a second location and is configured to decrease the beam size of the optical signal as received at the first location to a second beam size at the second location into an intermediate or carrier fourth waveguide 120d defined in the optical substrates on which the electrical backend is formed.

Although the illustrated fourth waveguide 120d is shown as a carrier waveguide in the electrical backend in the present examples, in various embodiments, the carrier waveguide can be defined outside of the electrical backend. Additionally, various embodiments can transfer optical signals directly into a carrier waveguide in the main photonic layer without an intermediary waveguide (e.g., from the third waveguide 120c to the seventh waveguide 120g; omitting the fourth waveguide 120d). Accordingly, the fourth waveguide 120d may be optional, or may be representative of several intermediate waveguides. By including one or more intermediate waveguides (such as the fourth waveguide 120d), the design of the PIC 100 increases separation of the end-face coupling to the silicon carrier substrate, which reduces interference at the end-face coupling. Additionally, although some illustrated examples show intermediate and carrier waveguides defined in the silicon substrate, in some embodiments intermediate waveguides and/or a carrier waveguide can be defined solely in the backend layers.

FIGS. 2A-2F illustrate cross-sectional views of the PIC 100 shown in FIGS. 1A and 1B in planes perpendicular to the cross-sectioned planes illustrated in FIGS. 1A and 1B, according to embodiments of the present disclosure. As will be appreciated, various features present in one cross-sectional view may be absent in other cross-sectional views, and the particular elements shown in FIGS. 2A-2F provide a non-limiting set of examples of elements that can be included in the electrical backend of the PIC 100.

Figure 2A:
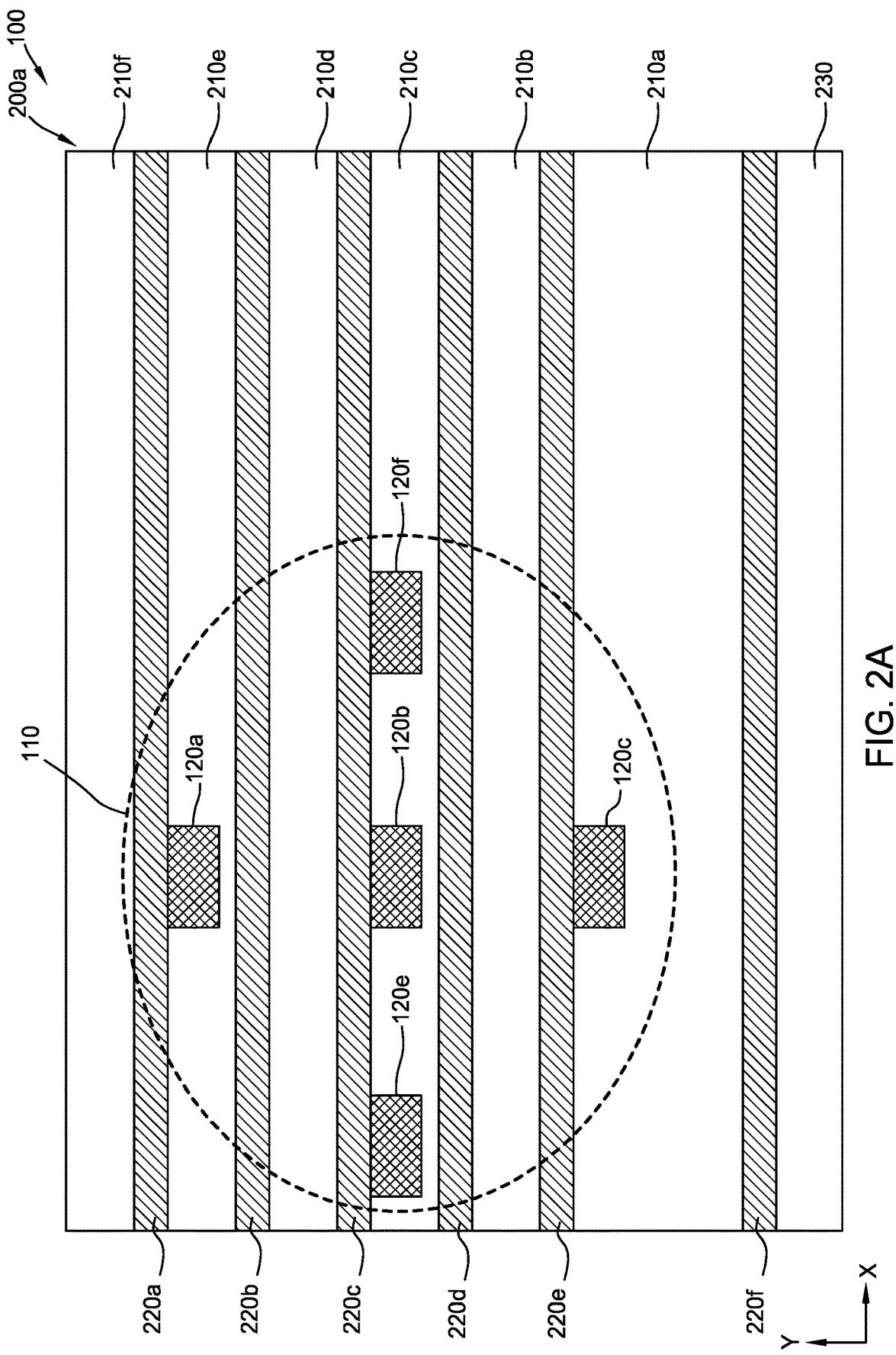
FIGS. 2A-2F illustrate cross-sectional views of the PIC shown in FIGS. 1A and 1B in planes perpendicular to the cross-sectioned planes illustrated in FIGS. 1A and 1B, according to embodiments of the present disclosure.
Figure 3:
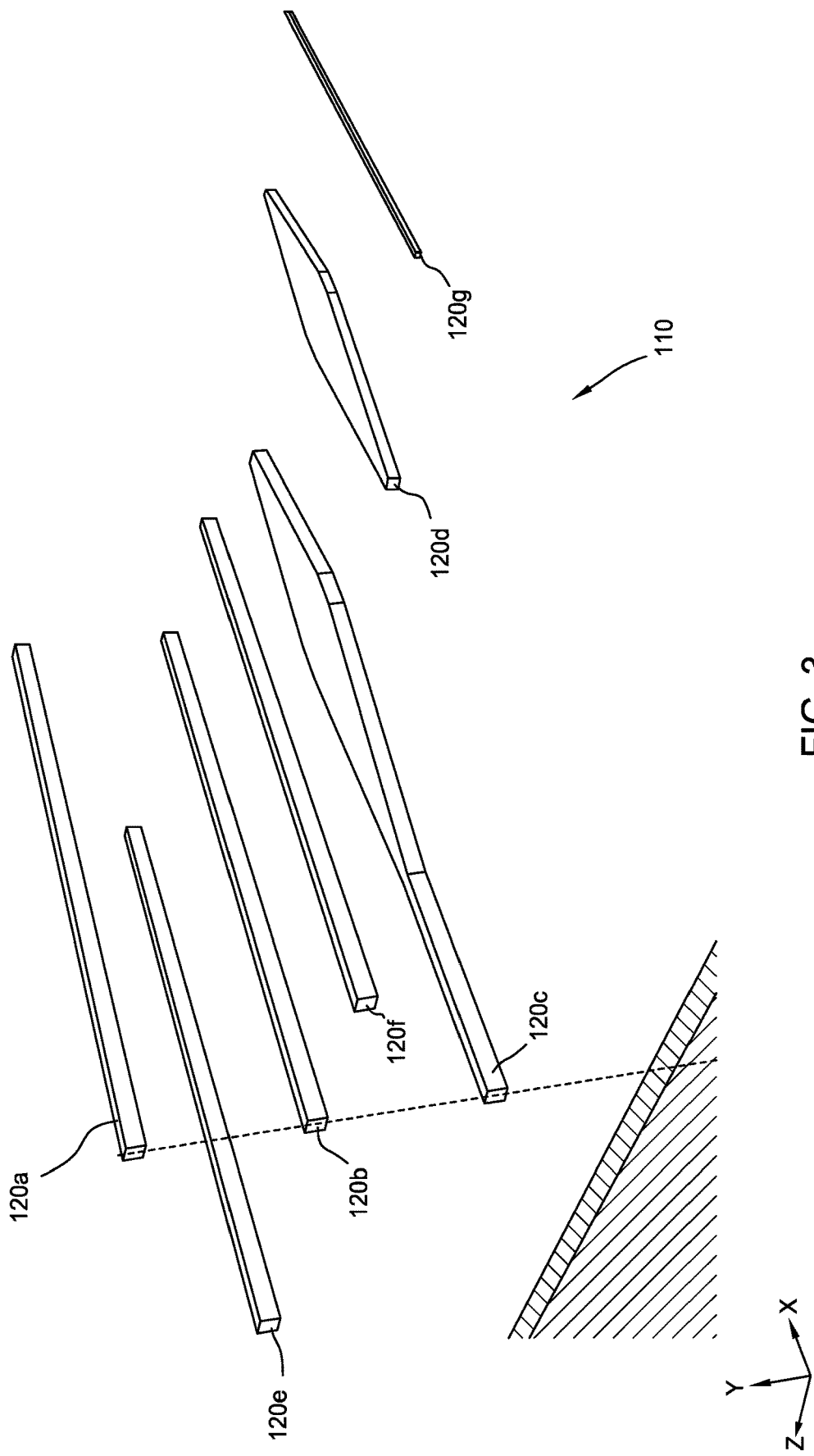
FIG. 3 illustrates an isometric view of the PIC shown in FIGS. 1A and 1B, highlighting the arrangement of waveguides in the waveguide array, according to embodiments of the present disclosure.

FIG. 2A illustrates a first view 200a of the PIC 100 at the end face interface where the optical fiber 130 shown in FIG. 1A optically couples with the PIC 100. As shown, the waveguide array 110 is shown with five waveguides 120, including waveguides 120a-c (shown in FIGS. 1A and 1B) and a fifth waveguide 120e and a sixth waveguide 120f. Each of the waveguides 120 are defined at a layer interface between a pair of layers of dielectric material. Adjacent layers of the dielectric material are separated from one another by various etch-stop materials to define spacer layers of a known thickness. As shown, the electrical backend of the PIC 100 includes six dielectric layers 210a-f (collectively or generally, dielectric layers 210) and six etch-stop layers 220a-f (collectively or generally, etch-stop layers 220) over a substrate 230. As will be appreciated, more or fewer dielectric layers 210 and etch-stop layers 220 of different thicknesses may be used in various embodiments.

The dielectric layers 210 are defined at desired heights (e.g., in the Y direction) to provide spacer layers in which optical and electrical elements are defined in the electrical backend through a layered manufacturing process. The dielectric material used in the dielectric layers 210 can be the same in each layer, or vary in different layers, and may include various optically transmissive dielectric materials for use as spacer materials, such as, for example, Silicon Dioxide ($SiO_2$), Silicon Nitride (SiN), Silicon Carbide (SiC), and other materials with lower refractive indices compared to the waveguide material used in the PIC 100. In various embodiments, each dielectric layer 210 may be of the same height as the other dielectric layers 210, or individual dielectric layers 210 may have different heights relative to one another.

Between each pair of the dielectric layers 210 (and between the substrate 230 and the first dielectric layer 210a) an etch-stop layer 220 is present. The etch-stop layers 220 separate layers of dielectric material from one another and provide a control in the formation of the electrical and optical elements in the electrical backend. The etch-stop materials can include various materials that may include SiN, SiC, Silicon Carbonitride, and other optically transmissive etch-stop materials. The etch-stop layers 220 mediate where the etching processes penetrate to in a layered fabrication process (as discussed in greater detail in regard to FIGS. 5A-5J and 6).

In one embodiment, the waveguides 120 of the waveguide array 110 are defined in cavities formed in the dielectric layers 210, and may be capped on one or both of an upper surface and a lower surface of the waveguide by an etch-stop layer 220. Individual waveguides 120 are made of a material with a higher index of refraction than the dielectric material of the dielectric layers 210 in above and below the individual waveguides 120 to anchor the optical signal in the waveguide array 110. The waveguide array 110 creates an optical mode of a size defined approximately by the horizontal and vertical extent of the waveguides 120 which confines the optical signal.

The substrate 230 defines one or more layers of Silicon or another semiconductor material in which the carrier, fourth waveguide 120d and one or more opto-electric components (not illustrated) such as signal modulators, signal detectors, phase shifters, or the like are defined. Although shown with a single layer in FIGS. 2A-2F, the substrate 230 may comprise several layers that include various optical, opto-electrical, and electrical components disposed therein that are not shown in the Figures.

Figure 2B:
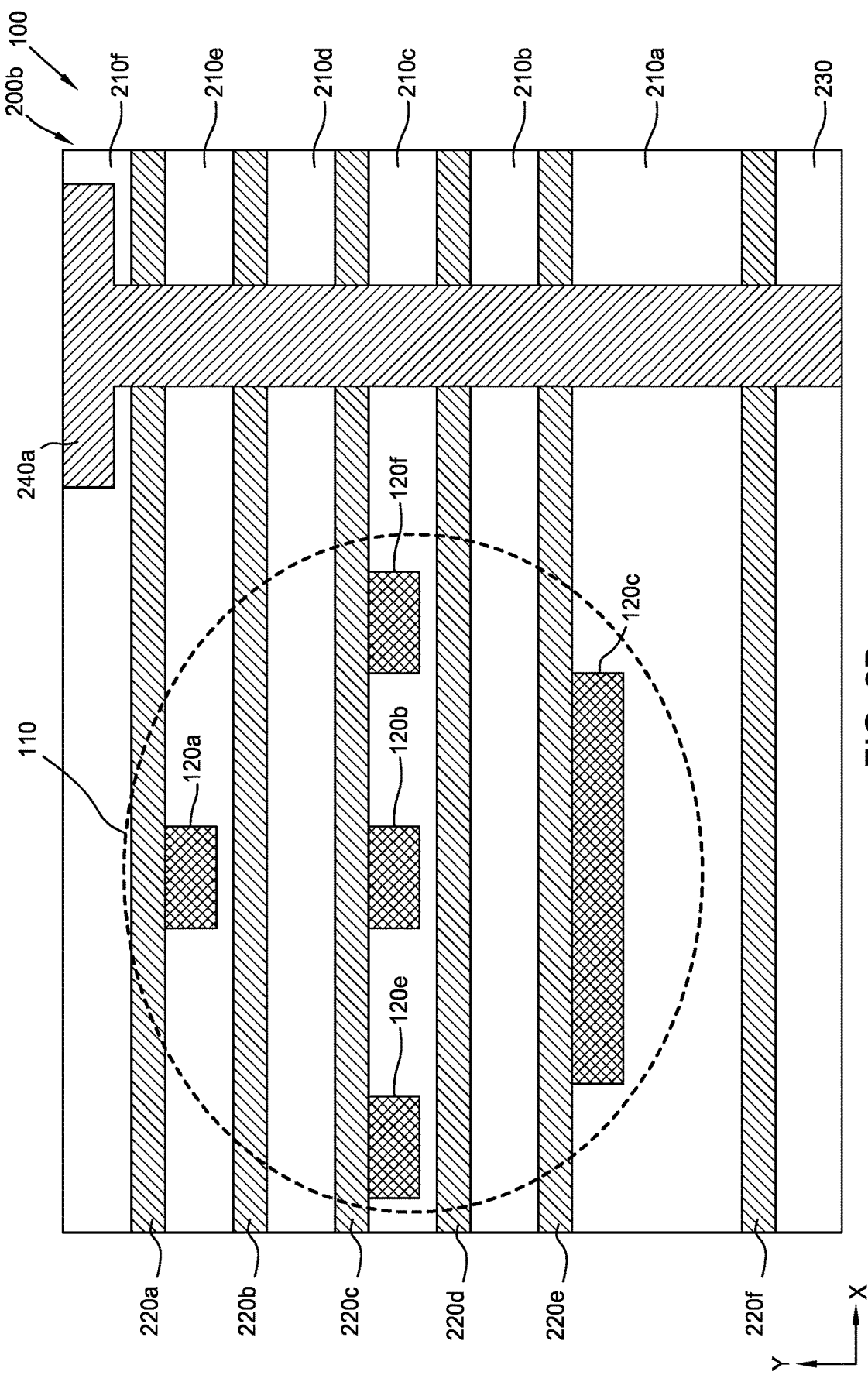
Figure 2C:
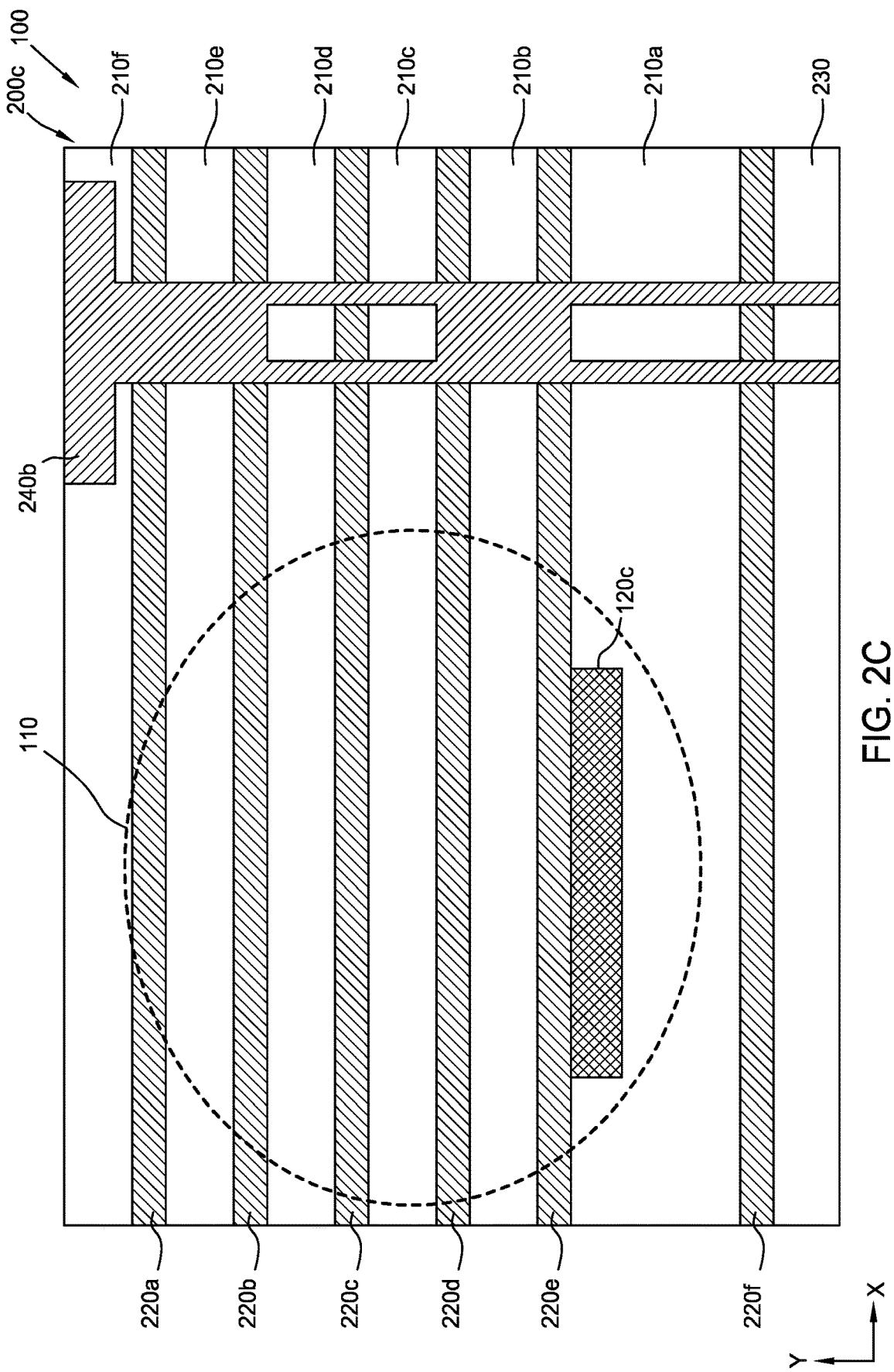
Figure 2D:
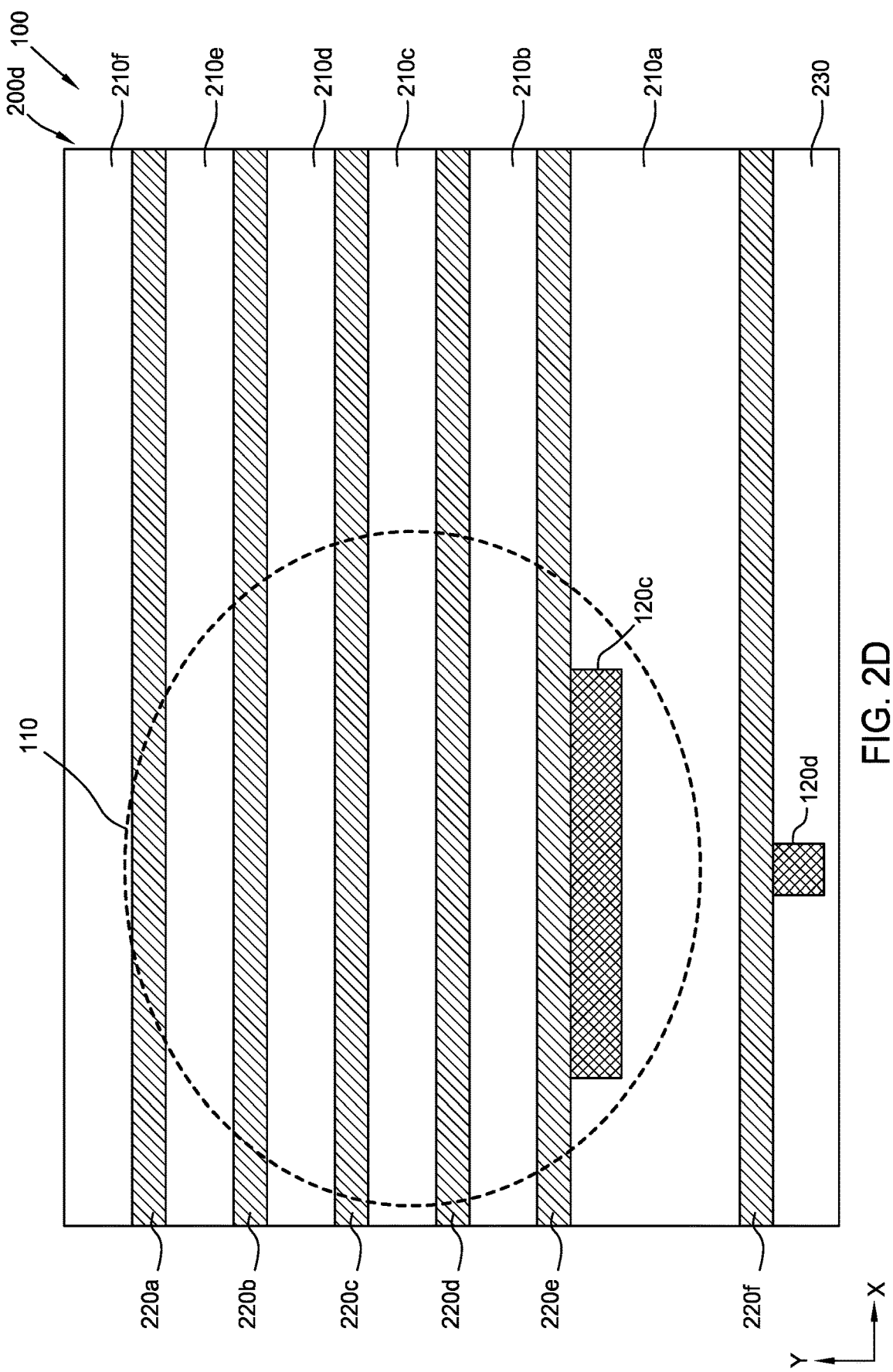
Figure 2E:
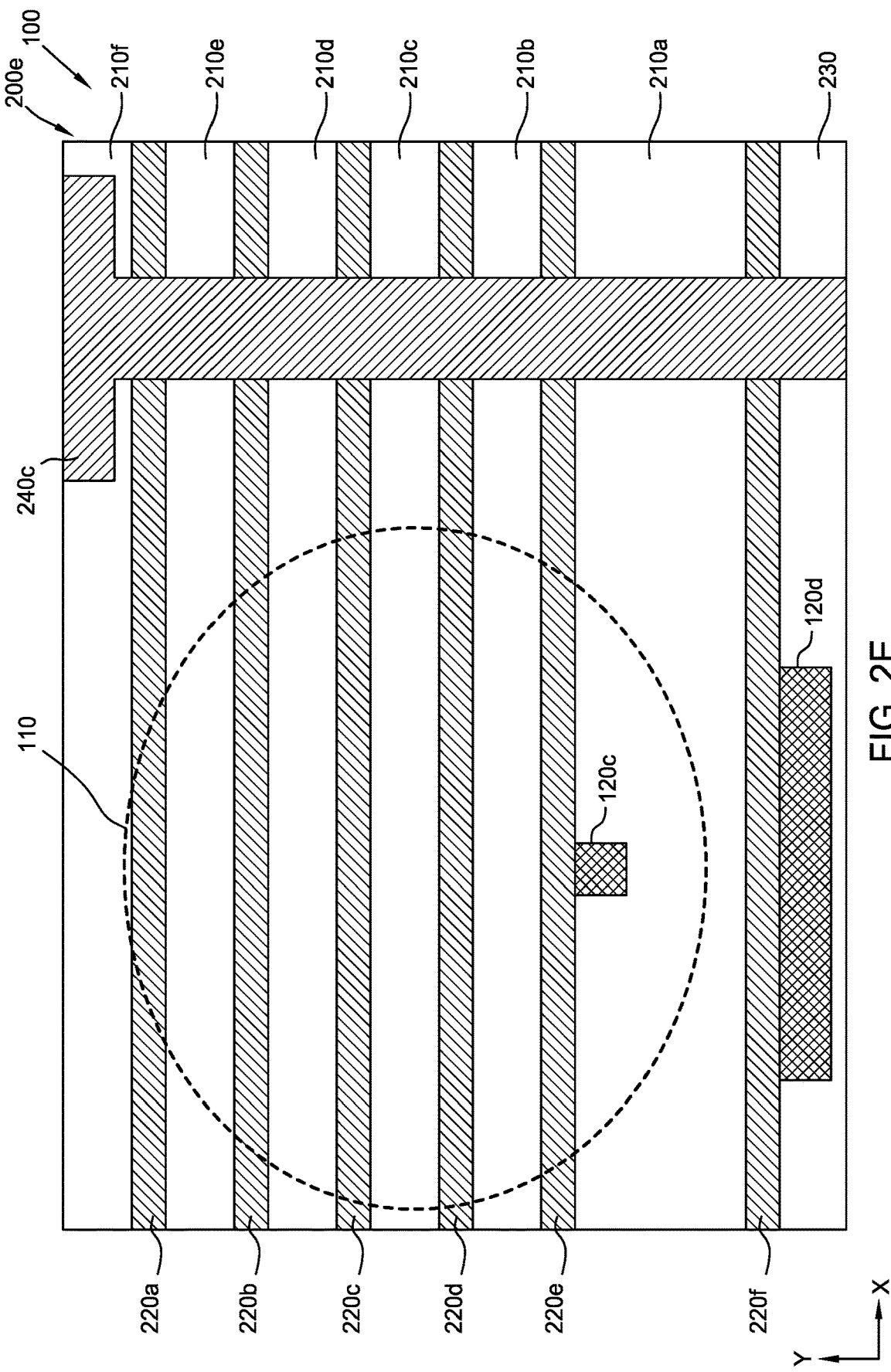

To make electrical contact with the components disposed in the substrate 230 of the electrical backend, the fabricator can include various electrical interconnects 240a-c (generally or collectively, electrical interconnects 240 or conductive interconnects) in different locations (as illustrated in FIGS. 2B, 2C, and 2E) with various depths into the PIC 100 and layouts to provide electrical contact from an exposed surface of the PIC 100 to various electrical and optoelectronic components included therein, or between individual components within the PIC.

Electrical interconnects connect different points in the backend. Connections may be made between points in the same dielectric layers. Also, as illustrated by electrical interconnects 240 in FIGS. 2B, 2C, and 2E, the electrical interconnects can extend through layers of the plurality of dielectric and etch-stop layers and one or more layers of the substrate 230 in a direction perpendicular to the direction of travel that the waveguides 120 run in. In various embodiments, some of the electrical interconnects 240 may extend through some or all of the dielectric and etch-stop layers (and not through the substrate 230), through some or all of the layers of the substrate 230 (e.g., as "bottom" contacts), and through all of the layers of the substrate 230 and some of the layers of the dielectric and etch-stop layers (e.g., as "bottom" contacts).

FIG. 2B illustrates a second view 200b of the PIC 100 further internal to the PIC 100 than the first view 200a shown in FIG. 2A. As the waveguides 120 travel away from the EFC surface of the PIC 100, the fabricator can change the cross-sectional areas of one or more of the waveguides 120 to concentrate the optical signal onto (or away from) the waveguides 120 relative to the initially received concentrations. For example, by increasing the relative cross-sectional area of the third waveguide 120c to the other waveguides 120 of the waveguide array 110, an optical signal received at the initial EFC interface (e.g., as in FIG. 2A) is shifted from an even distribution among the waveguides 120 to a distribution concentrated on the third waveguide 120c. In various embodiments, the fabricator may apply various tapers to the individual waveguides 120 to gradually concentrate light onto the single waveguide 120. In FIG. 2B, the relative cross-sectional area of the third waveguide 120c is increased by increasing the absolute cross-sectional area of the third waveguide 120c (relative to FIG. 2A), while leaving the absolute cross-sectional areas of the other waveguides 120 constant (relative to FIG. 2A). In various embodiments, in addition to or instead of increasing the absolute cross-sectional area of the single concentrating waveguide 120, a fabricator can decrease the absolute cross-sectional area of the other waveguides 120 in the waveguide array 110.

FIG. 2C illustrates a third view 200c of the PIC 100 further internal to the PIC 100 than the second view 200b shown in FIG. 2B. As the waveguide array 110 extends further into the PIC 100, the fabricator can further taper the waveguides 120 to further concentrate light onto a single waveguide 120; shown herein as the third waveguide 120c. For example, the fabricator has removed the first, second, fifth, and sixth waveguides 120a-b, 120e-f from the waveguide array 110 in the third view 200c. In various embodiments, the removal of one or more waveguides 120 from the waveguide array 110 may include a gradual reduction the absolute cross-sectional area of those waveguide 120, or a sudden termination of the waveguides 120.

FIG. 2D illustrates a fourth view 200d of the PIC 100 further internal to the PIC 100 than the third view 200c shown in FIG. 2C. The third waveguide 120c, onto which the other waveguides 120 of the waveguide array 110 have concentrated the optical signal, is presented with a fourth waveguide 120d (i.e., an intermediate or carrier waveguide 120) in the substrate 230.

FIG. 2E illustrates a fifth view 200e of the PIC 100 further internal to the PIC 100 than the fourth view 200d shown in FIG. 2D. The fabricator gradually adjusts the relative cross-sectional areas of the third waveguide 120c and the fourth waveguide 120d to vertically couple the optical signal from the third waveguide 120c into the fourth waveguide 120d. As shown from FIG. 2D to FIG. 2E, the fabricator gradually decreases the cross-sectional area of the third waveguide 120c while gradually increasing the cross-sectional area of the fourth waveguide 120d. Although shown with vertical coupling across one layer between two waveguides, in various embodiments, a vertical coupling may span more than one layer, and may be performed in various stages (e.g., by three or more waveguides 120 disposed in different layers).

Figure 2F:
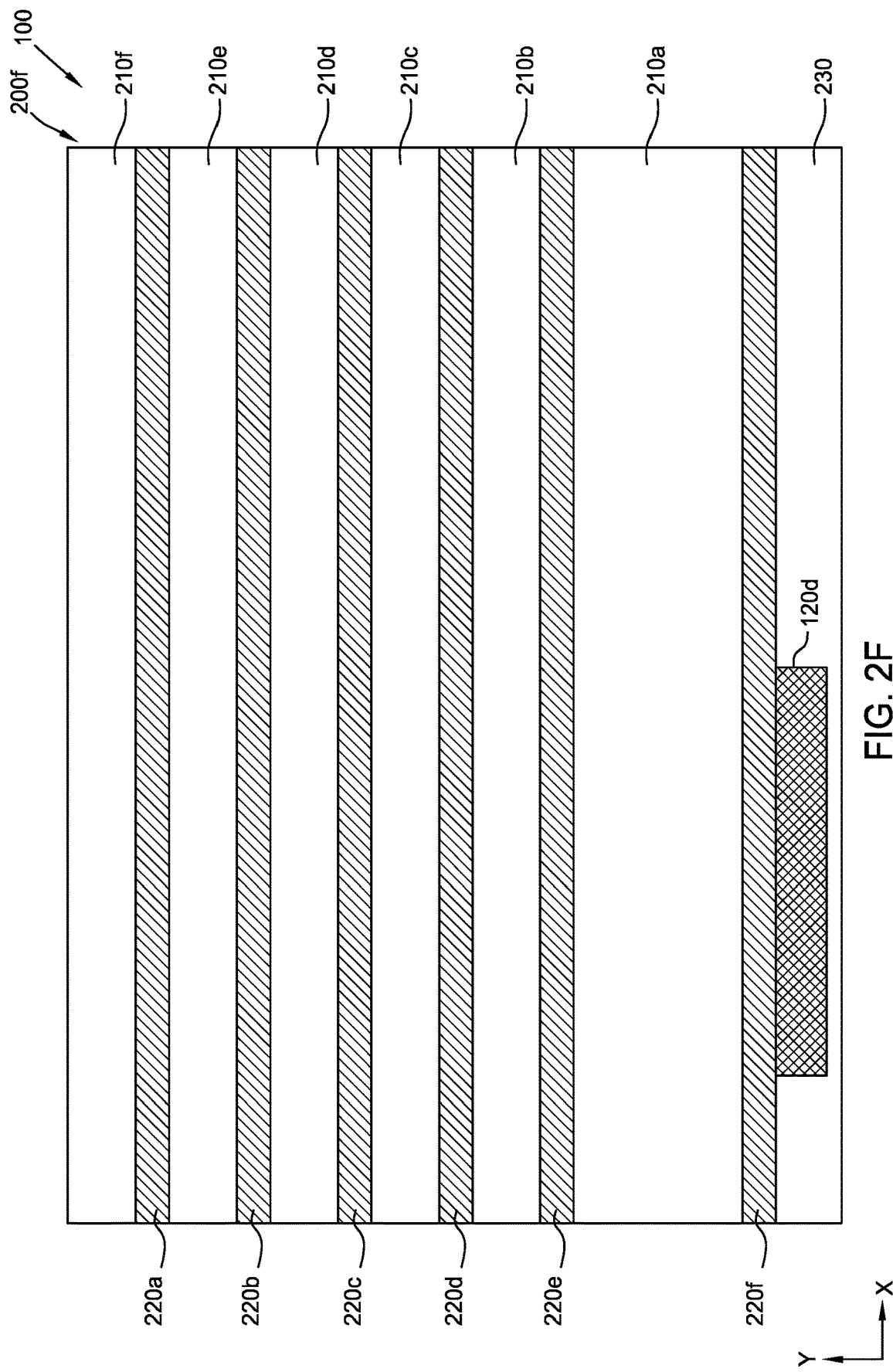

FIG. 2F illustrates a sixth view 200f of the PIC 100 further internal to the PIC 100 than the fifth view 200e shown in FIG. 2E. Once vertical coupling is complete, having shunted the optical signal from the third waveguide 120c to the fourth waveguide 120d, the fabricator may terminate the third waveguide 120c, and thereby terminate the waveguide array 110.

FIG. 3 illustrates an isometric view of the PIC 100 shown in FIGS. 1A and 1B and 2A-2F, highlighting the arrangement of waveguides 120 in the waveguide array 110, according to embodiments of the present disclosure. The electrical interconnects 240 shown in FIGS. 2B, 2C, and 2E are not illustrated in FIG. 3 so as to better show the arrangement of the waveguides 120.

The EFC arrangement achieved by the waveguide array 110 between an optical fiber 130 (shown in FIG. 1A) and a carrier waveguide within the PIC 100. The waveguide array 110 receives an optical signal into the PIC 100 from the optical fiber 130 in the same direction of travel as used in the optical fiber 130 (e.g., at the end face interface as per FIG. 1A and FIG. 2A). Then, along the length of the waveguide array 110 in the direction of travel, the waveguide array 110 concentrates the light onto a single waveguide 120 (e.g., the third waveguide 120c) of the waveguide array 110 by slowing altering the widths (or presence) of the various waveguides (e.g., as in FIGS. 2B-2C). The waveguide array 110, configured with an initial receiving area matched to the mode size of the optical fiber 130, and the gradual concentrating of the optical signal from the collective waveguides 120 to a single waveguide 120 of the waveguide array, adjusts the mode size for reception by a carrier waveguide 120 in the substrate 230.

Once concentrated on a single waveguide 120 of the waveguide array 110 (e.g., the third waveguide 120c), the optical signal may optionally be further vertically coupled onto a different level of the backend (e.g., the fourth waveguide 120d) or to a waveguide in the in the substrate (e.g., the fifth waveguide 120e) by reducing the cross-sectional area of the single waveguide 120 over the direction of travel while also increasing the cross-sectional area of the carrier waveguide 120 in the direction of travel. The two vertically coupled waveguides 120 (e.g., the third and fourth waveguides 120c-d) are configured to gradually shift the optical signal from one plane to another plane, to thereby carry the optical signal further into the PIC 100 for processing or analysis.

Figure 4C:
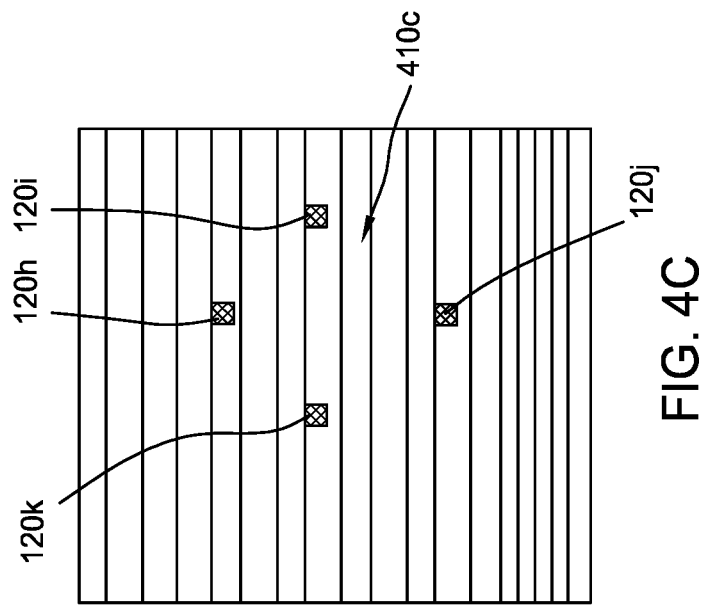
FIGS. 4A-4C illustrate various patterns for waveguides in a waveguide array, according to embodiments of the present disclosure.
Figure 4B:
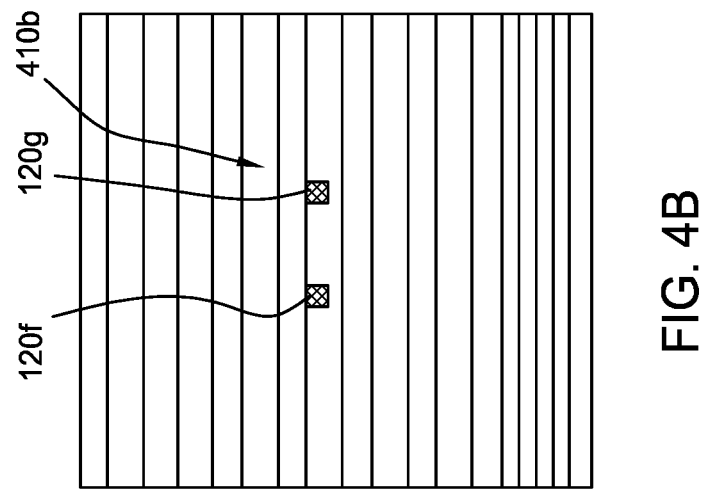
Figure 4A:
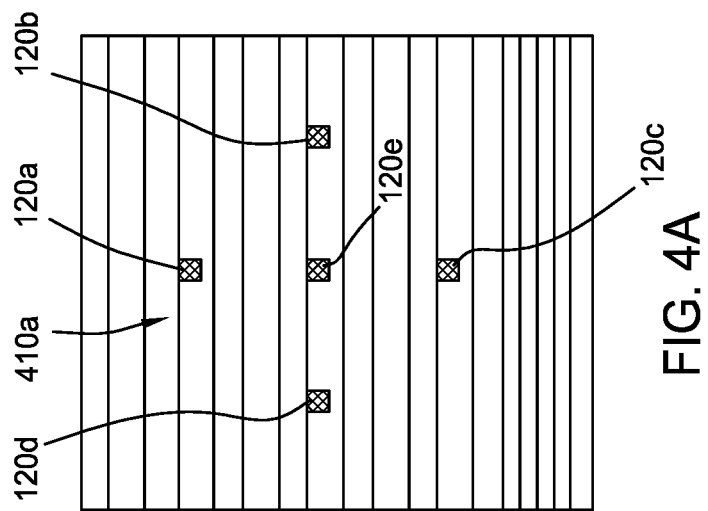

FIGS. 4A-4C illustrate various patterns 410a-c (generally or collectively, pattern 410) for waveguides 120 in a waveguide array 110, according to embodiments of the present disclosure. Although shown with different numbers of waveguides 120, each of FIG. 4A-4C may illustrate different waveguide arrays 110 or different cross-sectional views of one waveguide array 110 to account for beam-shaping along a direction of travel for an optical signal.

FIG. 4A illustrates a first pattern 410a that includes five waveguides 120a-e. In the first pattern 410a, three waveguides 120a, 120e, 120c are aligned vertically with one another in different layers of the dielectric material, and three waveguides 120d, 120e, 120b are aligned horizontally with one another in the same layer of the dielectric material, with waveguide 120e forming a central member of the waveguide array 110.

FIG. 4B illustrates a second pattern 410b that includes two waveguides 120f-g that are aligned horizontally with one another in the same layer of the dielectric material. In other embodiments, the second pattern 410b can be arranged so that the two waveguides 120f-g are aligned vertically with one another in different layers of the dielectric material FIG. 4C illustrate a third pattern 410c that includes four waveguides 120a-d. In the third pattern 410c, two waveguides 120h, 120j are aligned vertically with one another in different layers of the dielectric material, and two waveguides 120i, 120k are aligned horizontally with one another in the same layer of the dielectric material. The vertically alignment and horizontally alignment of the waveguides 120 are each centered on a shared point within the PIC 100.

The various patterns of waveguides arrays 110 are constructed to adjust optical signals of one mode size to another mode size. Accordingly, a fabricator can select the number, size, and the arrangement of the waveguides 120 to include in a waveguide array 110 based on the desired mode sizes for optical signals at various positions in the PIC 100.

FIGS. 5A-5J illustrate cross-sectional views of a fabrication process for a PIC 100 to include a waveguide array 110 in the electrical backend of the PIC 100, according to embodiments of the present disclosure. As the electrical backend includes a set of layers stacked upon one another with various components defined therein, a given ordinal designation (e.g., first, second, third), is provided in reference to the layers shown in FIGS. 5A-5J and not an absolute designation for the backend as a whole. For example, a first layer in one view of the backend may correspond to a fourth or seventh layer in different views of the backend.

Figure 5A:
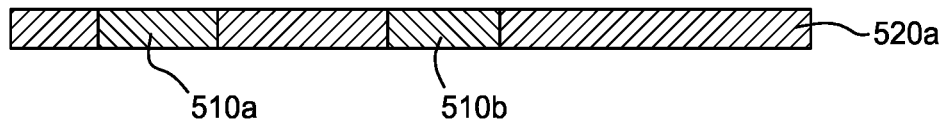
FIGS. 5A-5J illustrate cross-sectional views of a fabrication process for a PIC to include a waveguide array in the electrical backend of the PIC, according to embodiments of the present disclosure.

FIG. 5A illustrates an initial cross-sectional view, of a layer of the electrical backend or an upper level of the photonic layers of a PIC 100. In the initial view, a first layer 520a of a dielectric material includes a first electrical contact 510a and a second electrical contact 510b. Building on the initial cross-sectional view of FIG. 5A, a fabricator can deposit additional layers of dielectric materials and etch-stop materials to yield the second cross-sectional view in FIG. 5B.

Figure 5B:
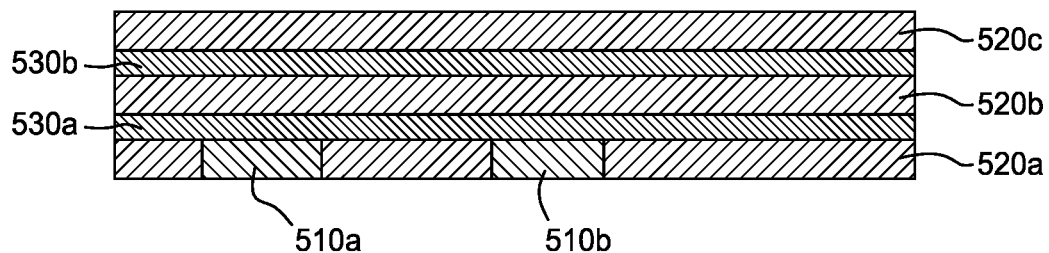

FIG. 5B illustrates a second cross-sectional view that includes a first etch-stop layer 530a deposited over the upper surfaces of the electrical contacts 510a-b and the first dielectric layer 520a, on which a second dielectric layer 520b is deposited. The second cross-sectional view also includes a second etch-stop layer 530b deposited over the upper surface of the second dielectric layer 520b, on which a third dielectric layer 520c is deposited. Building on the second cross-sectional view, a fabricator can define one or more cavities in the third dielectric layer 520c of desired cross-sectional areas to yield the third cross-sectional view in FIG. 5C. While this embodiment is described with three dielectric layers and two etch-stop layers, it is understood that a corresponding process is considered for only one set of layers or more than two sets of layers.

Figure 5C:
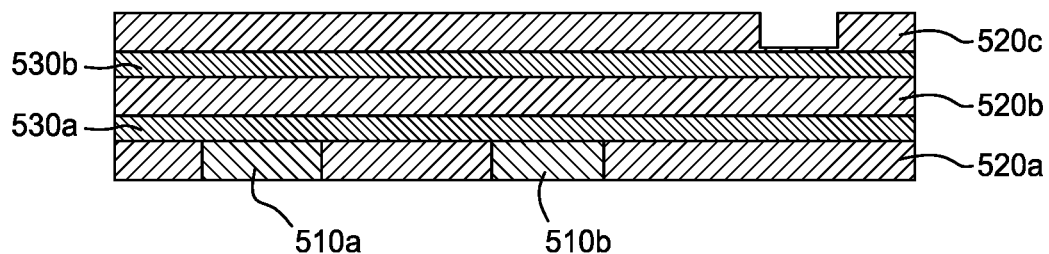

FIG. 5C illustrates a third cross-sectional view that includes a cavity defined in the third dielectric layer 520c. Although shown with one cavity, in various embodiments, a fabricator can define several cavities in the third dielectric layer 520c in preparation for forming various waveguides. The fabricator can define various cross-sectional areas for the cavities (and resulting waveguides) that may partially extend within the third dielectric layer 520c, fully down to the second etch-stop layer 530b, or beyond (e.g., into or past the second dielectric layer 520b). As will be appreciated, the fabricator can define the cavities to extend into or out of the page for various lengths and may keep the cross-sectional area constant or vary the cross-sectional area along the length of the cavity.

Figure 5D:
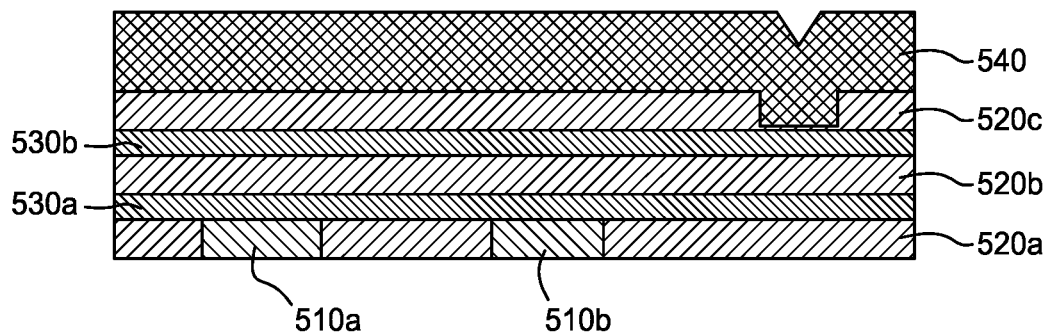

In FIG. 5D, the fabricator has deposited a waveguide material 540, such as SiN, over the third dielectric layer 520c, thus filling the cavity shown in FIG. 5C.

Figure 5E:
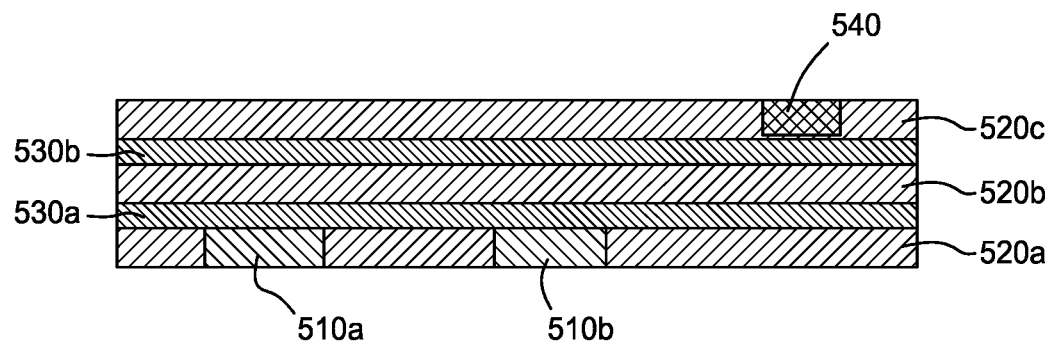

FIG. 5E illustrates a fifth cross-sectional view that shows that the fabricator has removed excess waveguide material 540 from the third dielectric layer 520c (as shown in FIG. 5D) providing a planar surface including the upper surface of the third dielectric layer 520c and the waveguide material remaining in the cavity. In various embodiments, the fabricator uses a chemical mechanical polishing process to remove the excess waveguide material to complete the construction of a waveguide 120 in the cavity defined in the third dielectric layer 520c. Building on the fifth cross-sectional view, a fabricator can define one or more cavities in the third dielectric layer 520c of desired cross-sectional areas to yield the sixth cross-sectional view in FIG. 5F.

Figure 5F:
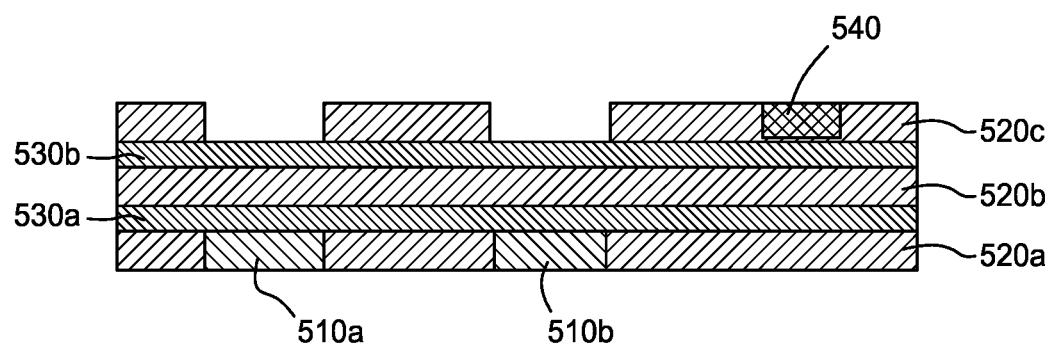

FIG. 5F illustrates a sixth cross-sectional view that includes two cavities defined in the third dielectric layer 520c. Although shown with two cavities, in various embodiments, a fabricator can define more or fewer cavities in the third dielectric layer 520c in preparation for forming various metallizations. The fabricator can define various cross-sectional areas for the cavities (and resulting metallization) that can extend down to the second etch-stop layer 530b. As will be appreciated, the fabricator can define the cavities to extend into or out of the page for various lengths and may keep the cross-sectional area constant or vary the cross-sectional area along the length of the cavity. Building on the sixth cross-sectional view, a fabricator can extend and (optionally) combine one or more cavities past the third dielectric layer 520c and through the second dielectric layer 520b to yield the seventh cross-sectional view in FIG. 5G.

Figure 5G:
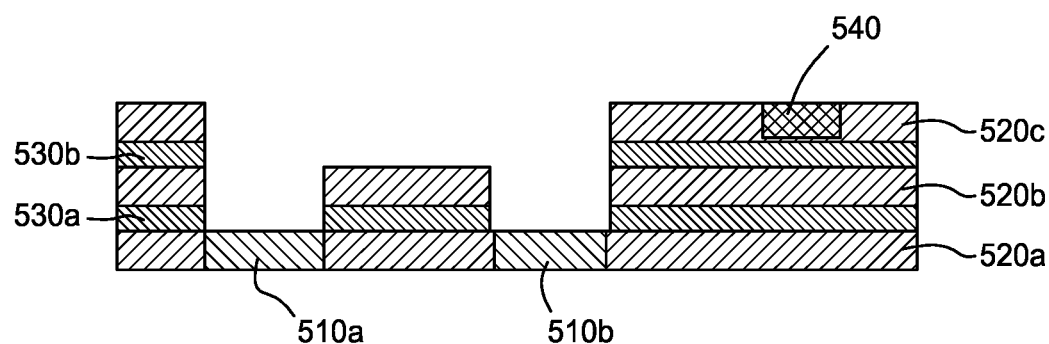

FIG. 5G illustrates a seventh cross-sectional view that includes a cavity defined through the third dielectric layer 520c, the second etch-stop layer 530b, the second dielectric layer 520b, and the first etch-stop layer 530a. The cavity combines the two cavities shown in FIG. 5F, etching through the intervening materials of the third dielectric layer 520c and through the second dielectric layer 520b to align with the first electrical contact 510a and the second electrical contact 510b. Building on the seventh cross-sectional view, a fabricator deposits a diffusion barrier and a metal seed to yield the eighth cross-sectional view in FIG. 5H.

Figure 5H:
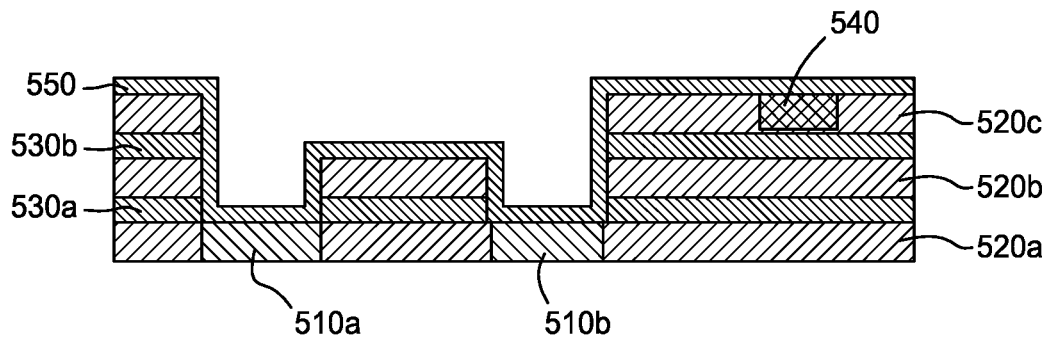

FIG. 5H illustrates an eighth cross-sectional view that includes additional process layers 550, such as a diffusion barrier and a metal seed, deposited on the exposed uppermost surfaces shown in the seventh cross-sectional view in FIG. 5G. In various embodiments, the fabricator uses physical vapor deposition (PVD) to prepare the surfaces for an electroplating operation to yield the ninth-cross sectional view of FIG. 5I.

Figure 5I:
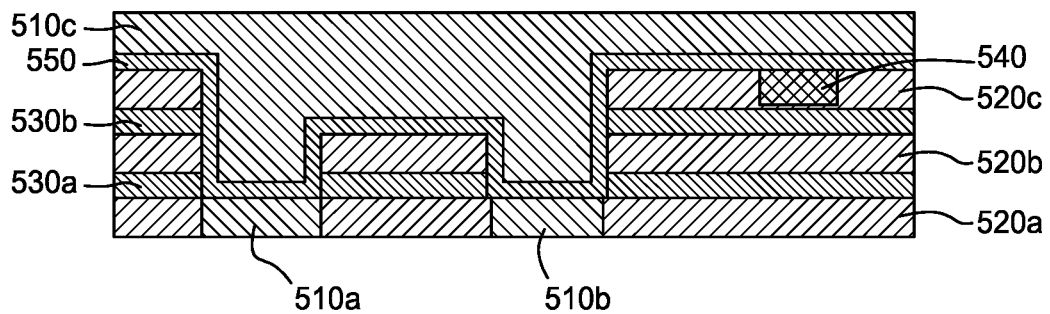

FIG. 5I illustrates a ninth cross-sectional view that includes a metal 510c electroplated to the surfaces treated with the metal seed (as in FIG. 5H). The electroplated metal fills the cavity formed through the second and third dielectric layers 520b-c and extends above the upper surface of the third dielectric layer 520c. Building on the ninth cross-sectional view, a fabricator removes the excess metal as well as excess process layers 550 above the upper surface of the third dielectric layer 520c (and any waveguides 120 defined therein) to yield the tenth cross-sectional view in FIG. 5J.

Figure 5J:
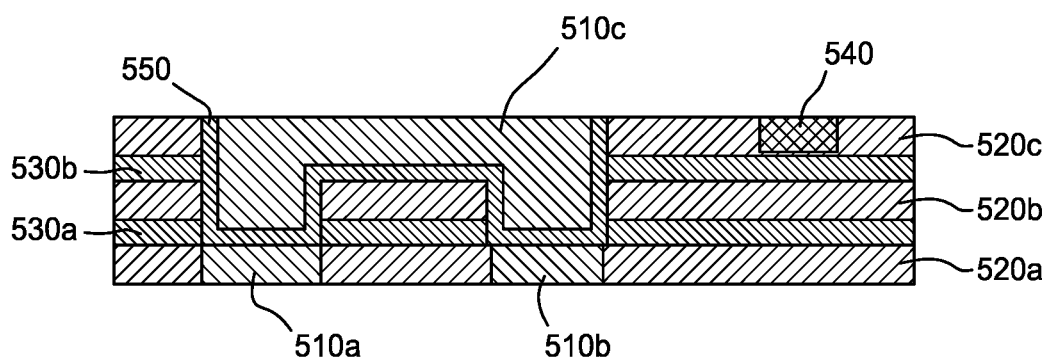

FIG. 5J illustrates a tenth cross-sectional view that planarizes the layers to provide a new surface on which to deposit additional layers of dielectric material to further extend the electrical backend. The fabricator may continue adding layers of dielectric material and defining optical and electrical elements therein at various positions to construct an electrical backend of a PIC 100 as described in FIGS. 1A-1B, 2A-2F, and 3 or various PICs 100 with different arrangements and numbers of elements defined therein.

FIGS. 6A-6K illustrate cross-sectional views of a fabrication process for a PIC 100 to include a waveguide array 110 in the electrical backend of the PIC 100, according to embodiments of the present disclosure. In contrast with the cross-sectional views illustrated in FIGS. 5A-5J, the fabricator has selected a different location in the layers to define a waveguide 120. The fabricator can define waveguides 120 in various locations in the stack of layers. As the electrical backend includes a set of layers stacked upon one another with various components defined therein, a given ordinal designation (e.g., first, second, third), is provided in reference to the layers shown in FIGS. 6A-6K and not an absolute designation for the backend as a whole. For example, a first layer in one view of the backend may correspond to a fourth or seventh layer in different views of the backend.

Figure 6A:
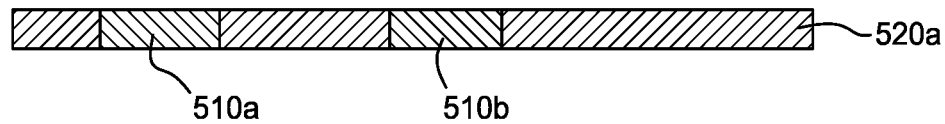
FIGS. 6A-6K illustrate cross-sectional views of a fabrication process for a PIC 100 to include a waveguide array 110 in the electrical backend of the PIC 100, according to embodiments of the present disclosure.

FIG. 6A illustrates an initial cross-sectional view, of a layer of the electrical backend or an upper level of the photonic layers of a PIC 100. In the initial view, a first layer 520a of a dielectric material includes a first electrical contact 510a and a second electrical contact 510b. Building on the initial cross-sectional view of FIG. 6A, a fabricator can deposit additional layers of dielectric materials and etch-stop materials to yield the second cross-sectional view in FIG. 6B.

Figure 6B:
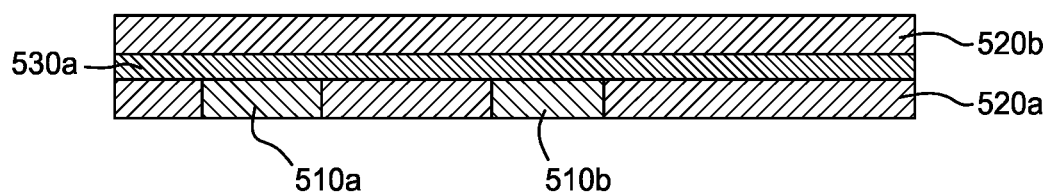

FIG. 6B illustrates a second cross-sectional view that includes a first etch-stop layer 530a deposited over the upper surfaces of the electrical contacts 510a-b and the first dielectric layer 520a, on which a second dielectric layer 520b is deposited. Building on the second cross-sectional view, a fabricator can define one or more cavities in the second dielectric layer 520b of desired cross-sectional areas to yield the third cross-sectional view in FIG. 6C. While this embodiment is described with two dielectric layers and one etch-stop layers, it is understood that a corresponding process is considered for various numbers of layers.

Figure 6C:
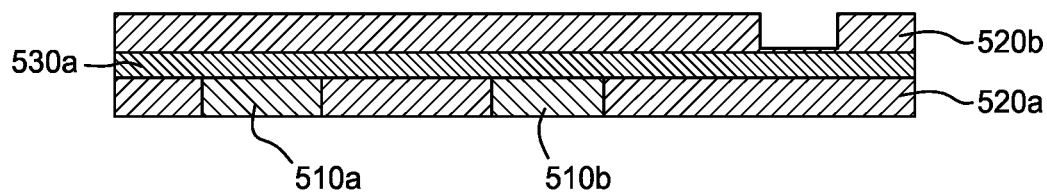

FIG. 6C illustrates a third cross-sectional view that includes a cavity defined in the second dielectric layer 520b. Although shown with one cavity, in various embodiments, a fabricator can define several cavities in the second dielectric layer 520b in preparation for forming various waveguides. The fabricator can define various cross-sectional areas for the cavities (and resulting waveguides) that may partially extend within the second dielectric layer 520b, fully down to the first etch-stop layer 530a, or beyond (e.g., into or past the first dielectric layer 520a). As will be appreciated, the fabricator can define the cavities to extend into or out of the page for various lengths and may keep the cross-sectional area constant or vary the cross-sectional area along the length of the cavity.

Figure 6D:
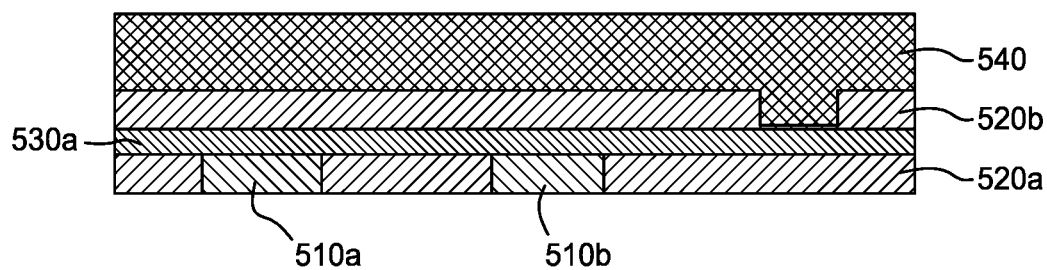

In FIG. 6D, the fabricator has deposited a waveguide material 540, such as SiN, over the second dielectric layer 520b, thus filling the cavity shown in FIG. 6C.

Figure 6E:
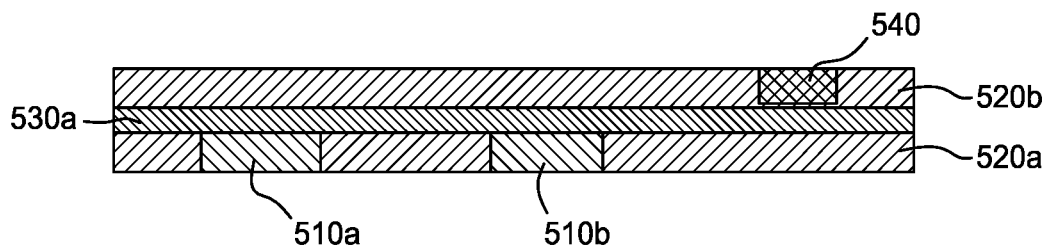

FIG. 6E illustrates a fifth cross-sectional view that shows that the fabricator has removed excess waveguide material 540 from the second dielectric layer 520b (as shown in FIG. 6D) providing a planar surface including the upper surface of the second dielectric layer 520b and the waveguide material 540 remaining in the cavity. In various embodiments, the fabricator uses a chemical mechanical polishing process to remove the excess waveguide material 540 to complete the construction of a waveguide 120 in the cavity defined in the second dielectric layer 520b. Building on the fifth cross-sectional view, a fabricator can deposit one or more layers of dielectric and etch-stop materials on the upper surface of the second dielectric layer 520b and the remaining waveguide material 540 to yield the sixth cross-sectional view in FIG. 6F.

Figure 6F:
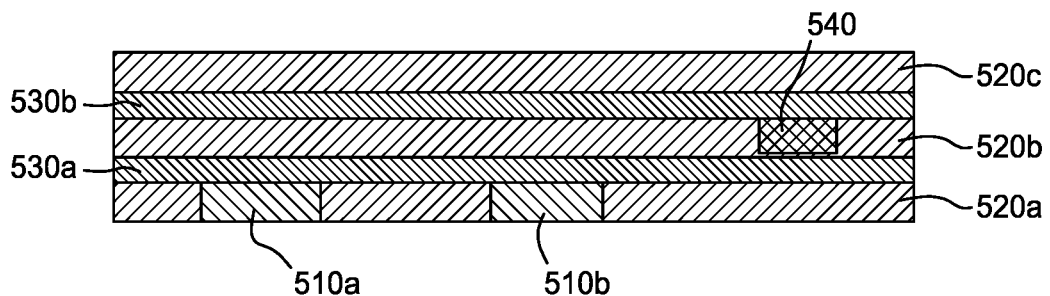

FIG. 6F illustrates a sixth cross-sectional view that shows that the fabricator has deposited a second etch-stop layer 530b on the upper surface of the second dielectric layer 520b and the remaining waveguide material 540, and a third dielectric layer 520c on the upper surface of the second etch-stop layer 530b. Although shown with two deposited layers, in various embodiments, the fabricator can deposit multiple layers of etch-stop material and dielectric material before proceeding to define cavities as in FIGS. 6G and 6H to expose the electrical contacts 510.

Figure 6G:
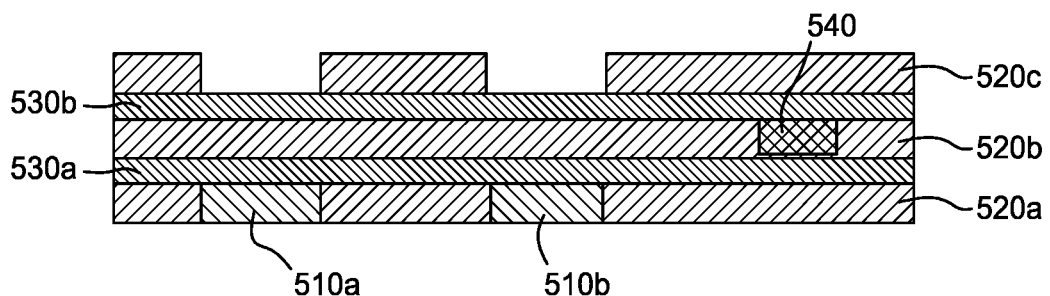

FIG. 6G illustrates a seventh cross-sectional view that includes two cavities defined in the third dielectric layer 520c. Although shown with two cavities, in various embodiments, a fabricator can define more or fewer cavities in the third dielectric layer 520c in preparation for forming various metallizations. The fabricator can define various cross-sectional areas for the cavities (and resulting metallization) that can extend down to the second etch-stop layer 530b. As will be appreciated, the fabricator can define the cavities to extend into or out of the page for various lengths and may keep the cross-sectional area constant or vary the cross-sectional area along the length of the cavity. Building on the seventh cross-sectional view, a fabricator can extend and (optionally) combine one or more cavities past the third dielectric layer 520c and through the second dielectric layer 520b to yield the seventh cross-sectional view in FIG. 6H.

Figure 6H:
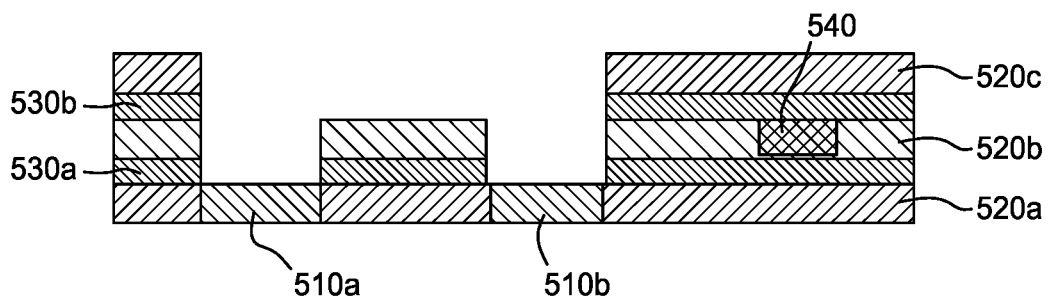

FIG. 6H illustrates an eighth cross-sectional view that includes a cavity defined through the third dielectric layer 520c, the second etch-stop layer 530b, the second dielectric layer 520b, and the first etch-stop layer 530a. The cavity combines the two cavities shown in FIG. 6G, etching through the intervening materials of the third dielectric layer 520c and through the second dielectric layer 520b to align with the first electrical contact 510a and the second electrical contact 510b. Building on the eighth cross-sectional view, a fabricator deposits a diffusion barrier and a metal seed as a process layer 550 to yield the ninth cross-sectional view in FIG. 6I.

Figure 6I:
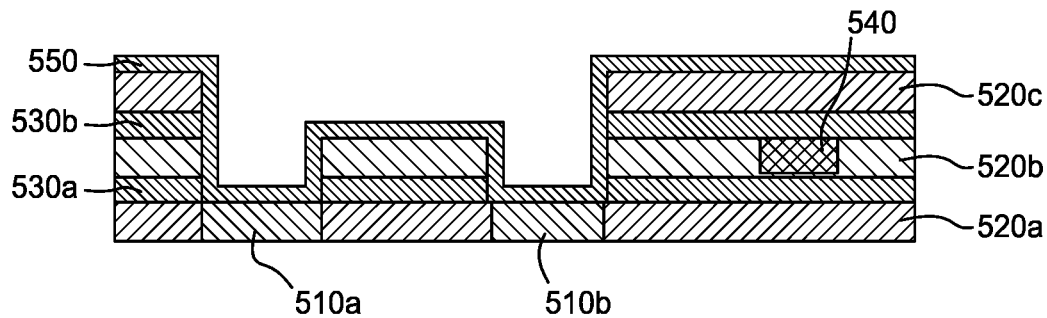

FIG. 6I illustrates a ninth cross-sectional view that includes process layers 550, such as a diffusion barrier and a metal seed, deposited on the exposed uppermost surfaces shown in the eighth cross-sectional view in FIG. 6H. In various embodiments, the fabricator uses physical vapor deposition (PVD) to prepare the surfaces for an electroplating operation to yield the tenth-cross sectional view of FIG. 6J.

Figure 6J:
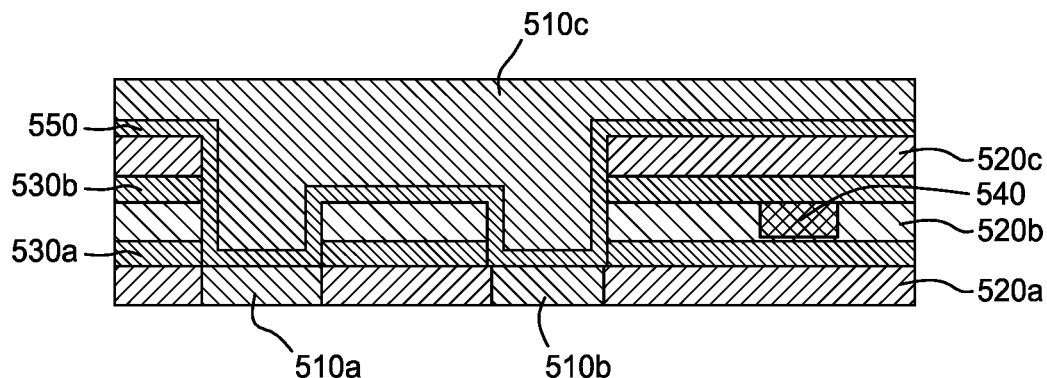

FIG. 6J illustrates a tenth cross-sectional view that includes a metal 510c electroplated to the surfaces treated with the metal seed as a process layer 550 (as in FIG. 6I). The electroplated metal fills the cavity formed through the second and third dielectric layers 520b-c and extends above the upper surface of the third dielectric layer 520c. Building on the tenth cross-sectional view, a fabricator removes the excess metal 510c and excess process layers 550 above the upper surface of the third dielectric layer 520c (and any waveguides 120 defined therein) to yield the eleventh cross-sectional view in FIG. 6K.

Figure 6K:
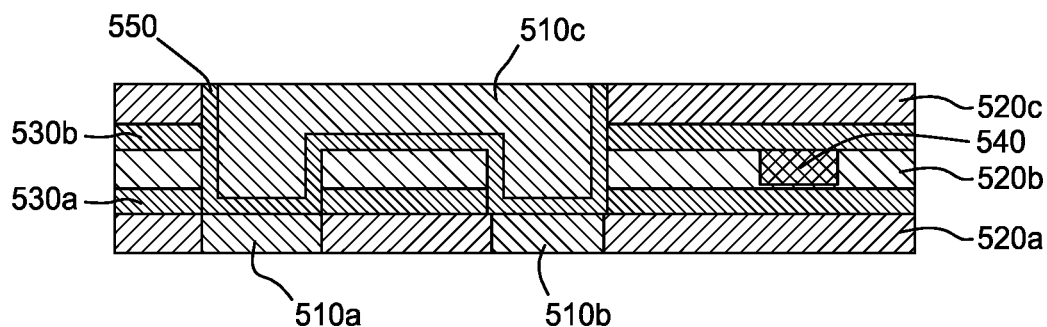

FIG. 6K illustrates an eleventh cross-sectional view that planarizes the layers to provide a new surface on which to deposit additional layers of dielectric material to further extend the electrical backend. The fabricator may continue adding layers of dielectric material and defining optical and electrical elements therein at various positions to construct an electrical backend of a PIC 100 as described in FIGS. 1A-1B, 2A-2F, and 3 or various PICs 100 with different arrangements and numbers of elements defined therein.

Figure 7:
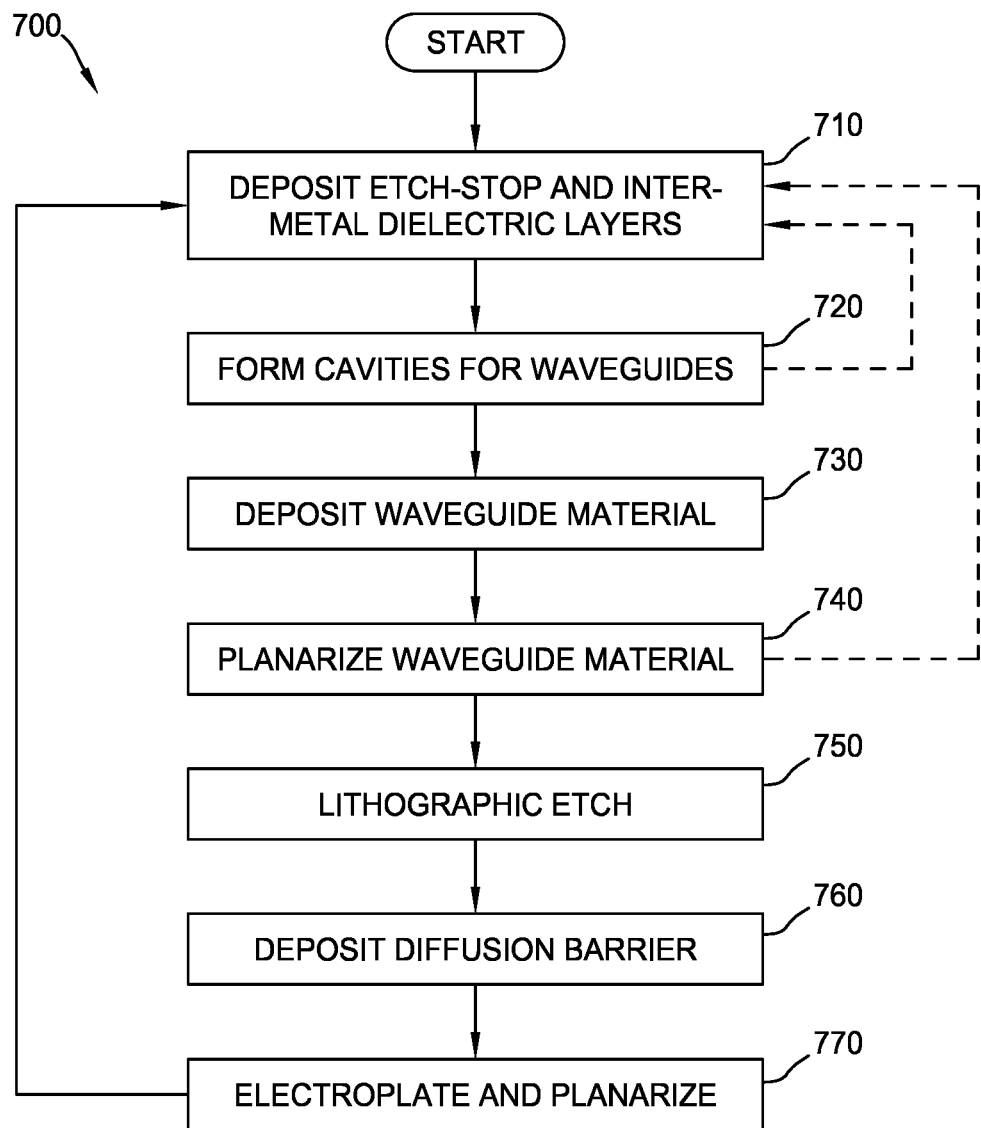
FIG. 7 is a flowchart of a method for fabricating a PIC to include a waveguide array in the electrical backed thereof, according to embodiments of the present disclosure.

FIG. 7 is a flowchart of a method 700 for fabricating a PIC 100 to include a waveguide array in the electrical backend thereof, according to embodiments of the present disclosure. A fabricator may perform several iterations of method 700 to form several waveguides 120 and electrical conductors/interconnects in the electrical backend processes for fabricating the PIC 100. Therefore, a base layer in one iteration may have been formed as a final layer from a previous iteration, or a final layer in one iteration may provide a base layer in a subsequent iteration. Accordingly, although various layers may be referred to as a "first" or "second" layer, these ordinal designations are provided in the context of one iteration of method 700, and other ordinal designations may be used in contexts associated with multiple iterations of method 700. In some embodiments, the fabricator may choose to skip certain steps in the method 700 in some iterations to create iterations containing either waveguides or electrical contacts, but not both.

Method 700 begins a block 710, where the fabricator deposits a first etch-stop and a first dielectric layer over any layer of a PIC 100 being fabricated. The first dielectric layer provides a first surface defined in a first plane on which the fabricator deposits a second etch-stop layer and a second dielectric layer. In various embodiments, the fabricator deposits a second etch-stop layer and a second dielectric layer in a respective second plane and third plane to define a spacer layer above which one or more waveguides 120 can be formed at a known height and depth as per FIGS. 5A-5J, and may continue adding layers of etch-stop and dielectric material until a desired height from the initial layers is achieved. In other embodiments, such as when the desired height from the initial layers in achieved by one set of layers as per FIGS. 6A-6K, the fabricator proceeds to block 720 after depositing a first etch-stop and a first dielectric layer.

At block 720, the fabricator forms a desired number of cavities matching the number of waveguides to be formed at the height of the uppermost dielectric layer. In various embodiments, the fabricator may form zero cavities, and may return to block 710 for the next iteration of method 700. For example, after depositing a second etch-stop layer and a second dielectric layer, per block 710, if the fabricator does not wish to form a cavity for a waveguide 120 in the second dielectric layer, method 700 progresses to block 750 to form electrical interconnects in blocks 750, 760, and 770.

When the desired number of cavities is at least one, the fabricator uses various lithographic processes to etch downward through the second dielectric layer to a desired depth (including up to, down to, or beyond an etch-stop layer) with a desired width to form a cavity matching the desired cross-sectional area of a waveguide 120 to include in the PIC 100. In various embodiments, the width of the cavity may vary at various portions of the PIC 100 to define various shapes for the intended waveguide to guide optical signals to different layers of the PIC 100, beam forming, or the like. The cavities define various waveguide paths of desired cross-sectional areas in the plane perpendicular to the surface of the dielectric layers. Additionally, when forming multiple cavities, whether in one iteration or in multiple iterations of method 700, the cross-sectional areas and lengths of the individual cavities may be the same or different sizes from one another.

When using a chemical etching process to form the cavities in block 720 (in addition to or instead of a mechanical etching process), the fabricator may apply a resist mask to the exposed face of the uppermost dielectric layer to define the desired width(s) of the cavities being formed. If a resist mask is applied, the fabricator removes the resist mask at the conclusion of block 720.

At block 730, the fabricator deposits waveguide material into the cavities formed in block 720. The fabricator deposits waveguide material on the uppermost dielectric layer and into any cavities formed therein. In one example, the fabricator uses chemical vapor deposition to deposit a film of SiN onto the exposed surfaces of the PIC 100.

At block 740, the fabricator planarizes the waveguide material deposited in block 730. In various embodiments, the fabricator removes any waveguide material above the plane defined by the upper surface of the dielectric layer in which any cavities were formed per block 720. In various embodiments, the fabricator uses a chemical mechanical polishing (CMP) process on the surface of the waveguide material in the shared plane with the uppermost dielectric layer, at which point, the waveguide is complete. After planarization, no or minimal waveguide material is present at a height greater than the upper surface of the uppermost dielectric layer. Stated differently, the cavities are filled with waveguide material, and define a shared planar surface with the uppermost dielectric layer on which future iterations of method 700 may deposit additional layers of dielectric material in or on which a fabricator can define additional electrical or optical elements. In some embodiments, method 700 may return to block 710 for the fabricator to deposit additional layers of dielectric and etch-stop materials, as per FIGS. 6A-6K, before proceeding to block 750.

At block 750, the fabricator lithographically etches additional cavities to establish electrical contact to the electrical interconnects through any intervening etch-stop layers and dielectric layers to the plane defined by the upper surfaces of the uppermost dielectric layer and the waveguides defined therein. In various embodiments, the lithographic etching may be performed in one step or multiple steps using one or both of mechanical and chemical etching techniques. In one example, the fabricator performs a first lithographic etch through the uppermost dielectric layer until reaching the uppermost etch-stop layer (see e.g., FIGS. 5F and 6G) and then performs a second lithographic etch through the uppermost etch-stop layer and through the next dielectric layer to expose one or more underlying electrical conductors (see e.g., FIGS. 5G and 6H). In various embodiments, the lithographic etching forms various different shapes for an intended extension of the electrical conductors thus exposed.

At block 760, the fabricator deposits a diffusion barrier and a metallization seed as a process layer 550, on the surfaces exposed by the etching processes perform in block 750 and the upper surface of the uppermost dielectric layer.

At block 770, the fabricator electroplates a metal in the cavity formed in block 750 to form an interconnect between the electrical conductor(s) exposed by the cavity to the upper surface of the uppermost dielectric layer. In various embodiments, the fabricator removes any electroplated metal above the plane defined by the upper surface of the uppermost dielectric layer in which the cavities were formed per block 750. In various embodiments, the interconnect forms the basis of an electrical contact used in subsequent iterations of method 700, or may provide a contact surface by with surface traces, mounted components, or wires may electrically connect to one or more active elements defined within the PIC 100.

In various embodiments, after block 770, method 700 may return to block 710 to perform additional iterations. During subsequent iterations, the dielectric, waveguide(s), and electrical interconnect(s) formed in the earlier iteration are encapsulated by additional layers of etch-stop material and dielectric materials in which more waveguides are formed and the electrical connections are extended to the upper surface of the PIC 100. Once the fabricator has defined the desired number of waveguides in the electrical backend as well as the desired number of levels of electrical interconnects of the PIC 100, after completing block 770 in a final iteration, method 700 may conclude.

Accordingly, through several iterations of method 700, during a first iteration, a fabricator can form (per block 720) a first cavity in a first layer of a spacer material, deposit (per block 730) waveguide material over the first layer to fill the first cavity, planarize (per block 740) the waveguide material to define a first plane even with a first surface of the first layer, form (per block 750) a second cavity in the spacer material, electroplate (per block 770) a metal over the first plane to fill the second cavity to define an electrical interconnect through the spacer material; and remove (per block 770) a portion of the metal to the first plane to define a second surface of the electrical interconnect that is even with the first surface of the first layer. In some embodiments, the fabricator can form (per block 720) a third cavity in the first layer of the spacer material at a different location from the first cavity so that depositing (per block 730) the waveguide material over the first layer fills the third cavity to define an additional waveguide. Following the first iteration, the fabricator can deposit an etch-stop layer (per block 710) on the second surface and then deposit (per block 710) a second layer of the spacer material over the etch-stop layer to define a third surface parallel to the first surface of the first layer.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   forming a first cavity in a first layer of a spacer material;
   depositing a waveguide material over the first layer to fill the first cavity;
   planarizing the waveguide material to define a first plane even with a first surface of the first layer;
   forming a second cavity in the spacer material, wherein an etch-stop layer is formed above or below the spacer material, wherein the second cavity is etched through the etch-stop layer and the spacer material;
   electroplating a metal to fill the second cavity to define an electrical interconnect through the spacer material; and
   removing a portion of the metal to define a second surface of the electrical interconnect.

2. The method of claim 1, further comprising:
   forming the first layer of the spacer material over the etch-stop layer that is formed on a second layer of the spacer material;
   wherein forming the second cavity includes etching through the etch-stop layer and the second layer of the spacer material.

3. The method of claim 1, further comprising, before forming the second cavity:
   depositing the etch-stop layer on the first surface; and
   depositing a second layer of the spacer material over the etch-stop layer;
   wherein the second cavity is defined through the first layer and the second layer of the spacer material and the etch-stop layer.

4. The method of claim 1, further comprising:
   forming a third cavity in the first layer of the spacer material at a different location from the first cavity;
   wherein depositing the waveguide material over the first layer fills the third cavity.

5. The method of claim 1, further comprising:
   depositing a second etch-stop layer on the second surface; and
   depositing a second layer of the spacer material over the second etch-stop layer to define a third surface parallel to the first surface of the first layer.

6. The method of claim 5, further comprising:
   etching a third cavity through the second layer and the second etch-stop layer to the first surface;
   electroplating a second metal over the third surface to fill the third cavity to define a second electrical interconnect through the first layer and the second layer of the spacer material; and
   removing a portion of the second metal to the third surface to define a contact surface of the second electrical interconnect that is even with the third surface of the second layer.

7. A method, comprising:
forming an electrical conductor in a first dielectric layer, wherein a first surface of the electrical conductor and a second surface of the first dielectric layer define a first plane;
depositing a first etch-stop layer over the first plane in a second plane parallel to the first plane;
depositing a second dielectric layer on the first etch-stop layer in a third plane parallel to the second plane;
depositing a second etch-stop layer on the second dielectric layer in a fourth plane parallel to the third plane;
depositing a third dielectric layer on the second etch-stop layer in a fifth plane parallel to the fourth plane;
forming a first cavity in the third dielectric layer;
depositing waveguide material on the third dielectric layer and into the first cavity;
removing the waveguide material above the fifth plane relative to the third dielectric layer;
forming a second cavity through the fifth plane, fourth plane, third plane, second plane, and first plane, wherein the second cavity exposes the first surface of the electrical conductor from the first etch-stop layer; and
electroplating metal in the second cavity to form an interconnect between the electrical conductor and the fifth plane.

8. The method of claim 7, further comprising, before electroplating the metal, depositing a diffusion barrier and a metallization seed.

9. The method of claim 7, wherein the first dielectric layer, the second dielectric layer, and the third dielectric layer comprise a dielectric material having a lower refractive index compared to the waveguide material.

10. The method of claim 7, wherein forming the first cavity defines a waveguide path of a first cross-sectional area in a sixth plane, perpendicular to the first plane, and of a second cross-sectional area, different from the first cross-sectional area, in a seventh plane parallel to the sixth plane.

11. The method of claim 7, further comprising:
depositing a third etch-stop layer over the fifth plane in a seventh plane parallel to the fifth plane, wherein the third etch-stop layer and the third dielectric layer encapsulate the waveguide material to define a waveguide in an electrical backend.

12. The method of claim 11, further comprising:
forming a third cavity in the third dielectric layer, wherein depositing the waveguide material on the third dielectric layer fills the third cavity to define a second waveguide in the electrical backend, wherein the waveguide and the second waveguide comprise a waveguide array.

13. A method, comprising:
forming a first cavity in a first layer of a spacer material;
depositing a waveguide material over the first layer to fill the first cavity;
planarizing the waveguide material to define a first plane even with a first surface of the first layer;
forming a second cavity in the spacer material;
electroplating a metal to fill the second cavity to define an electrical interconnect through the spacer material;
removing a portion of the metal to define a second surface of the electrical interconnect;
depositing an etch-stop layer on the second surface; and
depositing a second layer of the spacer material over the etch-stop layer to define a third surface parallel to the first surface of the first layer.

14. The method of claim 13, further comprising:
forming the first layer of the spacer material over a second etch-stop layer that is formed on the second layer of the spacer material;
wherein forming the second cavity includes etching through the second etch-stop layer and the second layer of the spacer material.

15. The method of claim 13, further comprising, before forming the second cavity:
depositing a second etch-stop layer on the first surface; and
depositing the second layer of the spacer material over the second etch-stop layer;
wherein the second cavity is defined through the first layer and the second layer of the spacer material and the second etch-stop layer.

16. The method of claim 13, further comprising:
forming a third cavity in the first layer of the spacer material at a different location from the first cavity;
wherein depositing the waveguide material over the first layer fills the third cavity.

17. The method of claim 13, further comprising:
etching a third cavity through the second layer and the etch-stop layer to the first surface;
electroplating a second metal over the third surface to fill the third cavity to define a second electrical interconnect through the first layer and the second layer of the spacer material; and
removing a portion of the second metal to the third surface to define a contact surface of the second electrical interconnect that is even with the third surface of the second layer.

* * * * *